United States Patent [19]

Ishida et al.

[11] Patent Number: 5,745,160

[45] Date of Patent: Apr. 28, 1998

[54] VIDEO CONVERSATION/MONITORING SYSTEM HAVING A REMOTE MONITORING FUNCTION

[75] Inventors: Kiyoshi Ishida; Nobuyoshi Torii, both of Yokohama; Toshio Watanabe, Kamakura; Takehiko Yamada, Chigasaki; Masato Kidokoro, Yokohama; Toru Ebihara, Sagamihara; Atsuko Nakao, Tokyo; Tokusou Matsuda, Yokohama; Nobuyuki Matsuyama, Fujisawa; Tooru Aramaki, Yokohama, all of Japan

[73] Assignee: Hitachi, Ltd., Tokyo, Japan

[21] Appl. No.: 705,314

[22] Filed: Aug. 29, 1996

Related U.S. Application Data

[63] Continuation of Ser. No. 233,746, Apr. 26, 1994, Pat. No. 5,585,839.

[30] Foreign Application Priority Data

Apr. 28, 1993 [JP] Japan ................................ 5-102177

[51] Int. Cl.$^6$ ........................................... H04N 7/15
[52] U.S. Cl. ................................. 348/15; 348/16
[58] Field of Search .................................. 348/14, 15, 16, 348/20; 379/202, 204, 205, 206, 203; H04N 7/14, 7/15

[56] References Cited

U.S. PATENT DOCUMENTS

| | | | |
|---|---|---|---|
| 4,980,761 | 12/1990 | Natori | 348/15 |
| 5,003,532 | 3/1991 | Ashida et al. | 348/15 |
| 5,365,265 | 11/1994 | Shibata et al. | 348/14 X |
| 5,400,068 | 3/1995 | Ishida et al. | 348/14 |
| 5,412,418 | 5/1995 | Nishimura et al. | 348/14 |
| 5,418,560 | 5/1995 | Yasuda | 348/14 |
| 5,539,811 | 7/1996 | Nakamura et al. | 348/14 X |

*Primary Examiner*—John K. Peng
*Assistant Examiner*—John W. Miller
*Attorney, Agent, or Firm*—Antonelli, Terry, Stout, & Kraus, LLP

[57] ABSTRACT

A video conversation/monitoring system having a remote monitoring function includes a center station and multiple end stations linked through the ISDN network. The center station includes a video conversation/monitoring circuit, video input device, video output device, audio input device, audio output device, system controller, facsimile, and ISDN line terminating unit. Each end station includes a video conversation/monitoring circuit, system controller, first video input device, second video input device, audio input device, audio output device, calling device, first notification device, second notification device, detection device, facsimile, and ISDN line terminating unit. Based on the remote monitoring function of the video input device and the remote control function of the system controller for switching the video input device, various guidance services are accomplished in addition to the video-phonic conversation service. The integrated unit enables easy desk-top installation, the application of the ISDN network reduces the communication cost, and the provision of various state detection devices in the end stations enables image-based monitoring and state monitoring in addition to the conversation.

3 Claims, 22 Drawing Sheets

VIDEO CONVERSATION/MONITORING SYSTEM HAVING A REMOTE MONITORING FUNCTION

This is a continuation of application Ser. No. 08/233,746 filed Apr. 26, 1994, now U.S. Pat. No. 5,585,839.

BACKGROUND OF THE INVENTION

1. Field of the Invention

This invention relates to a multi-media communication system using an Integrated Service Digital Network (ISDN), and more particularly to an ISDN-based video conversation/monitoring system applicable to a complex conversation service system that includes a remote monitoring function.

2. Description of the Related Art

Conventional guidance systems, conversation systems and monitoring systems which communicate images, sounds, and data, as well as complex systems that integrate these types of systems, use analog telephone lines, dedicated communication lines or optical fiber lines or the like. An example of such systems is described in Japanese patent publication JPA-A-21095 and JP-A-4-315351.

The above-mentioned prior systems, when an existing analog telephone line is used, has problems in that the transmission line has a limited band width which consequently makes it is difficult to transmit efficiently moving image signals and complex signals that carry sound, images, and control data. Furthermore, such prior art systems typically employ a center station and end station facilities which are of large scale and which necessitate a large installation space.

The above-mentioned prior art systems, when a dedicated line or optical fiber line is used, has problems in that a new transmission line needs to be constructed, the service range and scale are limited by the network construction, all of which make construction of the system very expensive.

The above-mentioned prior art systems, when a public integrated-service digital communication network is used for the communication line, which advantageously removes the need for construction of a new communication line significantly reduces the operating communication cost of the system, has a particular problem in that the system is accessible by unlicensed terminal stations through the public communication line and the handling of information will be intricate for secrecy protection.

SUMMARY OF THE INVENTION

The present invention overcomes the deficiencies of the foregoing prior art systems by providing, as a first objective, a compact, simple, and economical video conversation/monitoring system which performs conversation and monitoring through a bidirectional transmission of sounds, images, and data among a plurality of terminal stations.

A second objective of the present invention is to provide a simple and reliable video conversation/monitoring system with an enhanced ability of secrecy protection and performance of conversation and monitoring.

A third objective of the present invention is to provide a video conversation/monitoring system that can be used easily by the user for carrying out conversation and monitoring.

A fourth objective of the present invention is to provide a video conversation/monitoring system that offers an unlimited service range in terms of time and people for carrying out the conversation.

A fifth objective of the present invention is to provide a video conversation/monitoring system that can be arranged flexibly by including various peripheral devices to accomplish a number of versatile uses in addition to offering bidirectional conversation for users.

In order to achieve the above objectives, video conversation/monitoring system of the present invention preferably may be incorporated within a desk-top videoconference unit. This unit, for example, includes a video-phonic conversation means installed in a center station and a plurality of end stations. Bidirectional communication between the center station and the end stations is made possible through an existing ISDN public line for carrying image, voice, and data signals inclusive of the facsimile. The center station equipment includes a video-phonic conversation means, video input means, video output means, audio input means, audio output means, system controller, facsimile and ISDN line terminating unit. Each end station equipment includes a video-phonic conversation means, system controller, first video input means, second video input means, video output means, audio input means, audio output means, calling means, first notification means, second notification means, detection means, facsimile and ISDN line terminating unit.

The center and terminal stations are given individual registered dial numbers so that the equipments having the registered numbers are linked exclusively, while disallowing the linkage of unlicensed terminal stations, and therefore the system has enhanced information secrecy protection. By the provision of a remote monitoring function based on the first video input means and a remote control function for switching the video input means by the system controller, the video conversation/monitoring system can be designed to be suitable for various guidance services besides the service of video-phonic conversation function.

In the video-phonic conversation means of an end station, a line controller communicates image, sound, and various other types of data signals with the center station equipment through the ISDN network. The first video input means operates to input an image of the whole interior of the end station, the second video input means operates to input the image of a visitor or the like, and the audio input means operates to input sound. These means send the entered images and sound to the center station equipment. The video output means releases the video signal received from the center station, and the audio output means releases the audio signal received from the center station. The calling means detects the visitor's request for conversation with the center station, the first notification means detects the presence or absence a keeper or other person, the second notification means detects the abnormality of the keeper or other person, and the detection means detects the entry or exit of a visitor to/from the room. These means send the detected signals to the center station equipment through the line controller. The facsimile receives, through the line controller, text and graphics information sent from the center station, and releases the information.

In the video-phonic conversation means of the center station, the video input means and audio input means operate to input and then send image and sound, respectively, of the center station to the end station equipment. The video output means and audio output means receive image and sound, respectively, from the end station and release them. The facsimile sends text and graphics information to the end station through the line controller. The system controller includes a control panel on which the video and audio signals of the whole system are switched, calls to end stations are controlled and notification signals provided by the calling means, first notification means, second notification means and detection means of end stations are displayed.

The video conversation/monitoring system of the present invention advantageously can be organized by using a commercialized videoconference unit and an existing ISDN public line, instead of dedicated facilities. Consequently, a simple and economical video conversation/monitoring system that performs bidirectional transmission of sounds, images, and data can be offered.

The system of the present invention also advantageously is designed to link equipments that have been registered in advance, with the center station equipment controlling the overall system, and consequently a video conversation/ monitoring system with a high secrecy protection ability against violation can be offered.

The video conversation/monitoring system of the present invention, is also advantageous in that a person who comes to an end station to use the conversation or monitoring functions of the system is not required to perform intricate operations on the system equipment, but instead can communicate with another person in the center station through a simple operation.

The present invention also can be designed to provide a general-purpose video conversation/monitoring system useful for any person. Such a system can prove to be versatile in that its terminal units can be designed and its camera angle can be set to meet a variety of body sizes of people.

The simple and economical video conversation/ monitoring system of the present invention also may be adapted to include, various peripheral devices so that communication of high-grade information can be performed while it performs its monitoring operation.

DESCRIPTION OF THE PREFERRED EMBODIMENTS

The video conversation/monitoring system based on this invention will be explained in detail with reference to the drawings.

Figure 1:
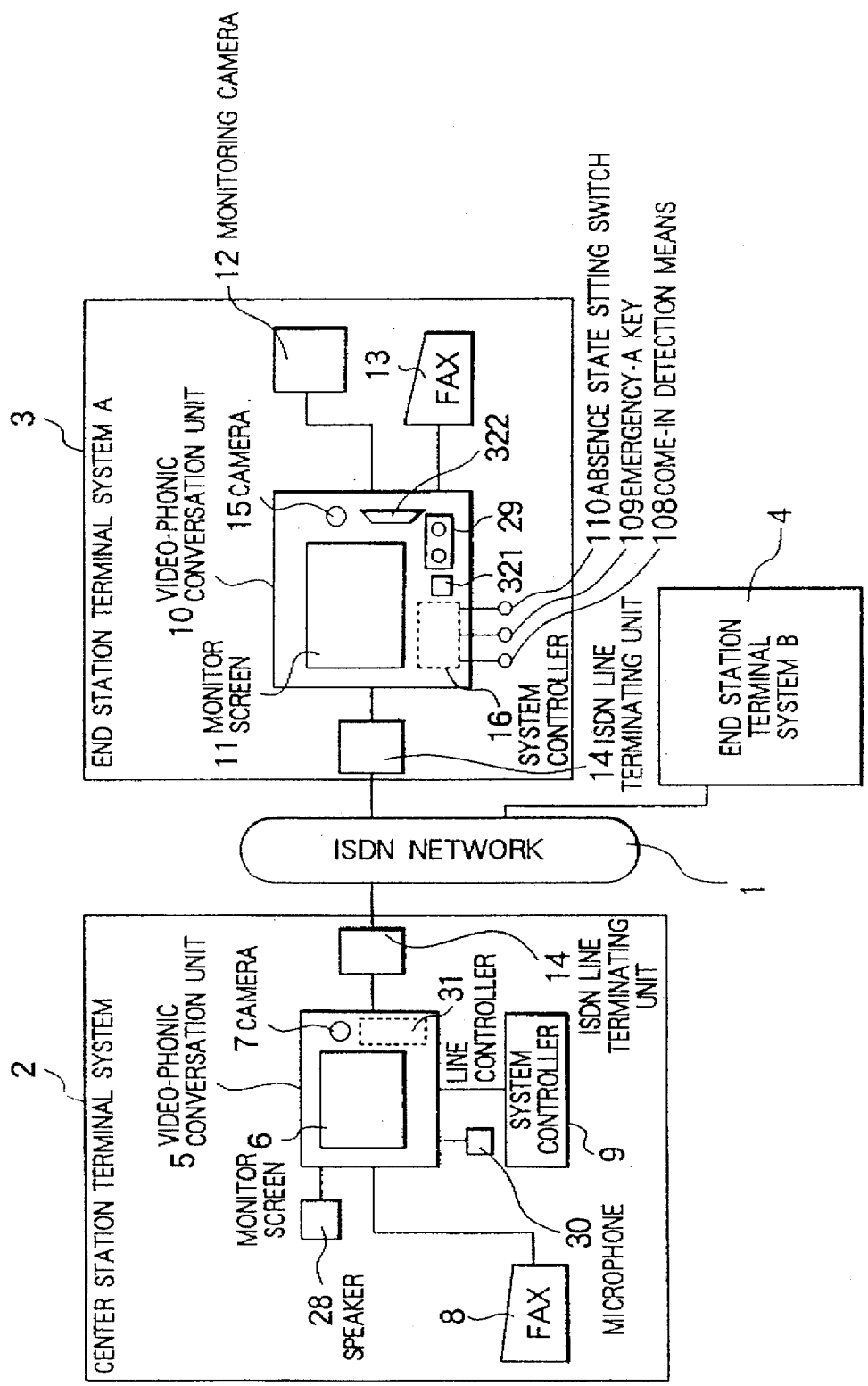
FIG. 1 is a block diagram showing the overall arrangement of a video conversation/monitoring system 5 based on this invention.

FIG. 1 is a block diagram showing the overall arrangement of a preferred embodiment of the video conversation/ monitoring system of the present invention. The system consists of a center station terminal system 2 installed at a center station and end station terminal systems A 3 and B 4 installed in end stations located in several places remote from the center station, all linked through an Integrated Service Digital Network (ISDN) 1 that is a public communication line. Although the system of this embodiment includes two end station terminal systems, the system may include three or more terminal systems. The center station terminal system 2 consists of a video-phonic conversation unit 5 as the video-phonic conversation means, a system controller 9, a facsimile 8 as the data communication terminal and an ISDN line terminating unit 14. The video-phonic conversation unit 5 includes a monitor screen 6 as the video output means and a conversation camera 7 as the video input means, with these devices being connected as shown in the figure. The end station terminal system 3 consists of a monitor screen 11 for providing a video guidance service for a visitor, a conversation camera 15 as the second video input means, a video-phonic conversation unit 10 that incorporates a system controller 16, a monitoring camera 12 as the first video input means for imaging the whole room where the end station terminal system is installed, a come-in detection means 108 for detecting the entry or exit of a visitor to/from the system installation room, an absence state setting switch 110 as the first notification means for setting that no person exists in the installation room, an emergency-A key 109 as the second notification means for notifying the center station of a state of emergency, a facsimile 13, and an ISDN line terminating unit 14, with these devices being connected as shown in the figure. The video-phonic conversation unit 10 of the end station terminal system consists of the integral system controller 16 which implements selection control between a conversation image taken by the conversation camera 15 and a room monitoring image taken by the monitoring camera 12 and various signal controls for the come-in detection means 108, absence state setting switch 110 and emergency-A key 109. The end station terminal system B 4 has the same arrangement as the end station terminal system A 3. The video-phonic conversation unit of the center station and end stations perform coding and decoding of still image, moving image, sound, and data signals, multiplex separation control, and bidirectional communication using a desk-top videoconference, such as the one described in Japanese patent publications JP-A-5-207449, JP-A-5-22720 (U.S. Ser. No. 07/913,402), JP-A-4-265086 and JP-A-4265087 (U.S. Ser. No. 07/838,348), filed by Applicants of the present invention, and also described in the publication Hitachi Hyoron, Vol. 74, No. 9 (particularly, pp. 15–20), published on Sep. 25, 1992.

Figure 2:
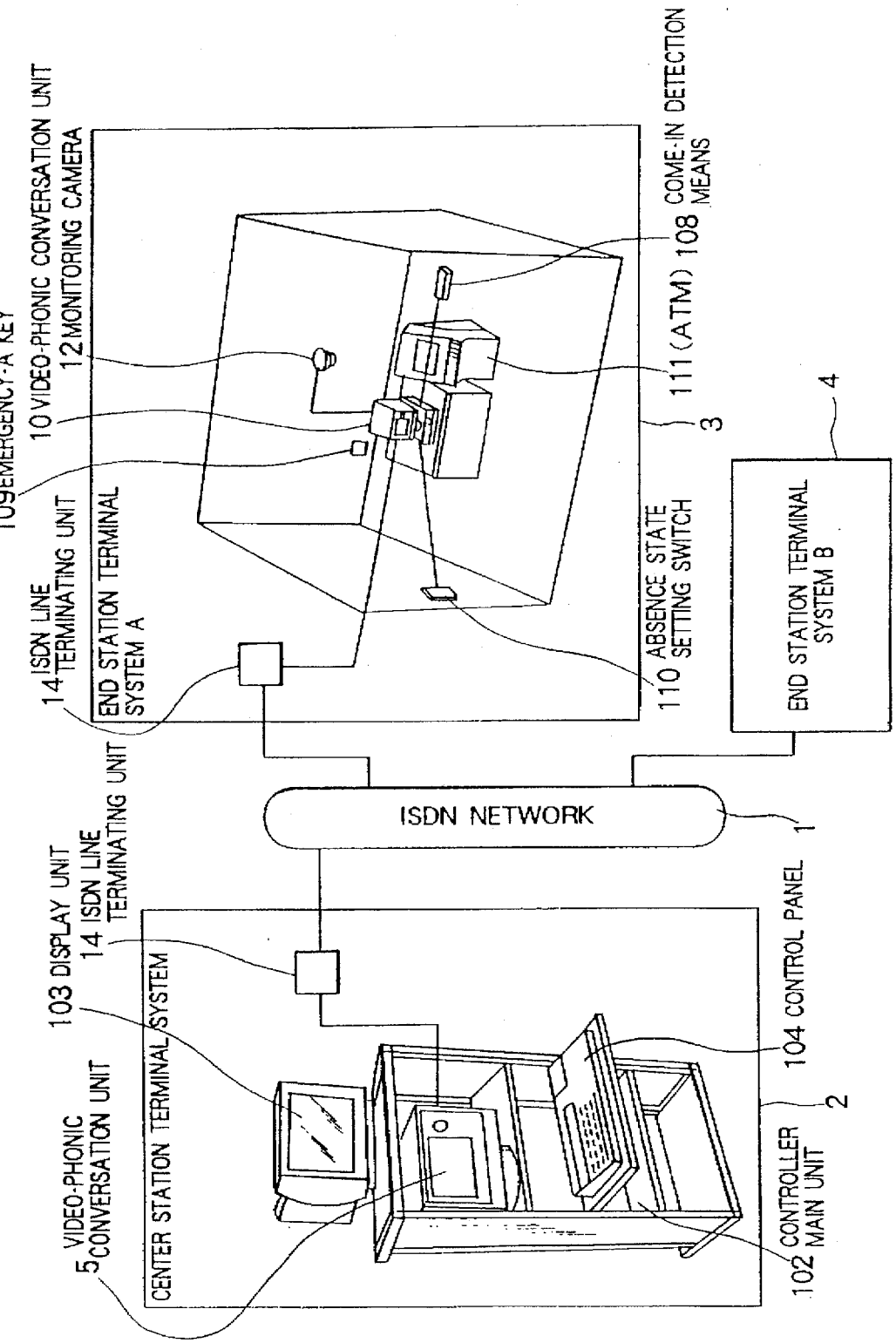
FIG. 2 is a perspective view of a video conversation/ monitoring system based on this invention.

FIG. 2 is an external view of a video conversation/ monitoring system based on this invention. The figure shows the case of the end station terminal system installed in the room of an automatic trading machine (ATM) 111. The monitoring camera 12 mounted on the ceiling of the terminal facility operates to shoot the whole interior of the facility. The monitoring camera 12 may be provided with a fish-eye lens so that the whole space is shot efficiently. In the figure, items 102, 103 and 104 of the center station are a controller main unit, display unit and control panel that constitute the system controller 9. These devices will be explained in detail in connection with FIG. 3.

Figure 3:
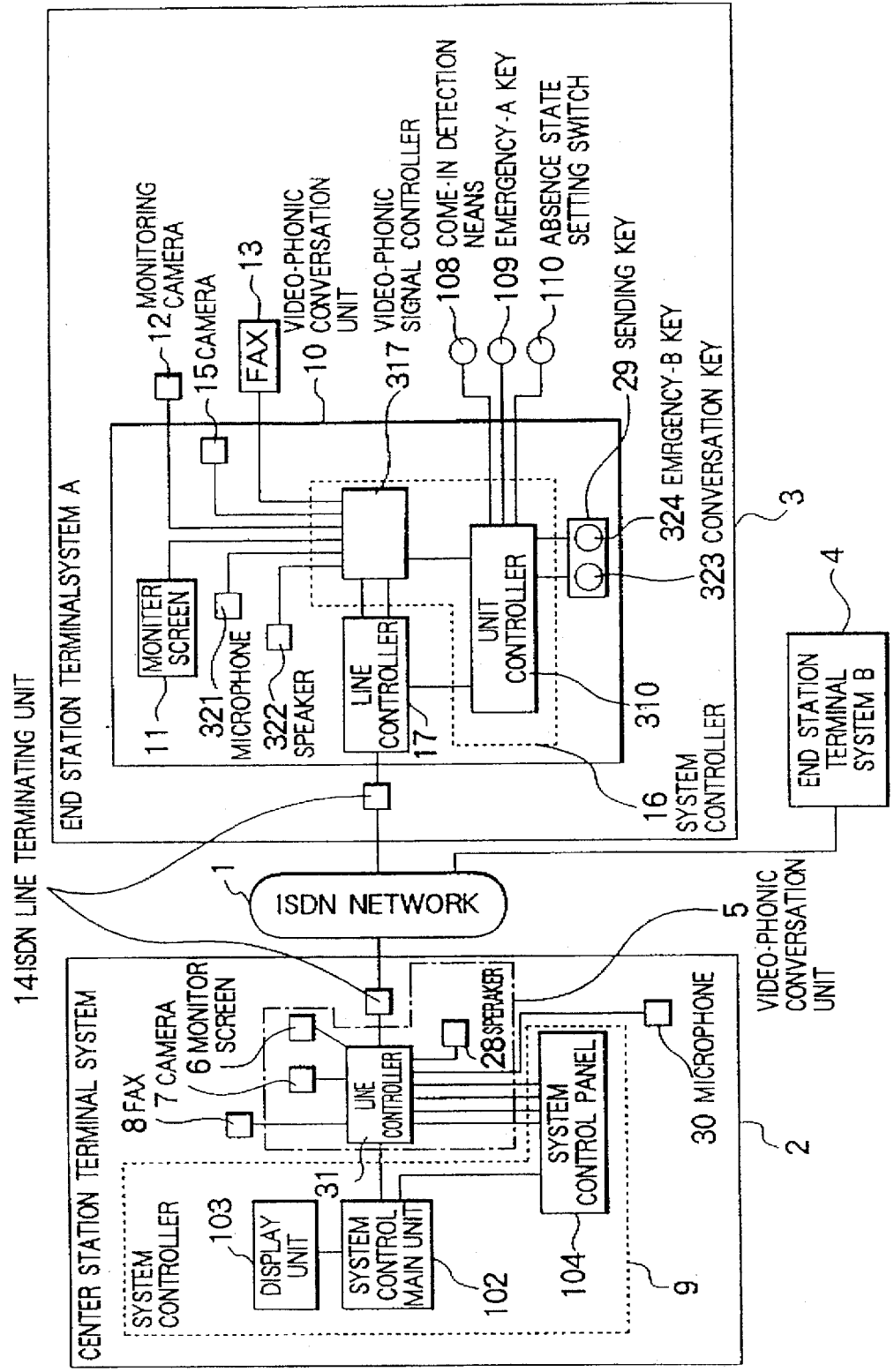
FIG. 3 is a block diagram showing the detailed arrangement of a video conversation/monitoring system based on this invention.
Figure 4:
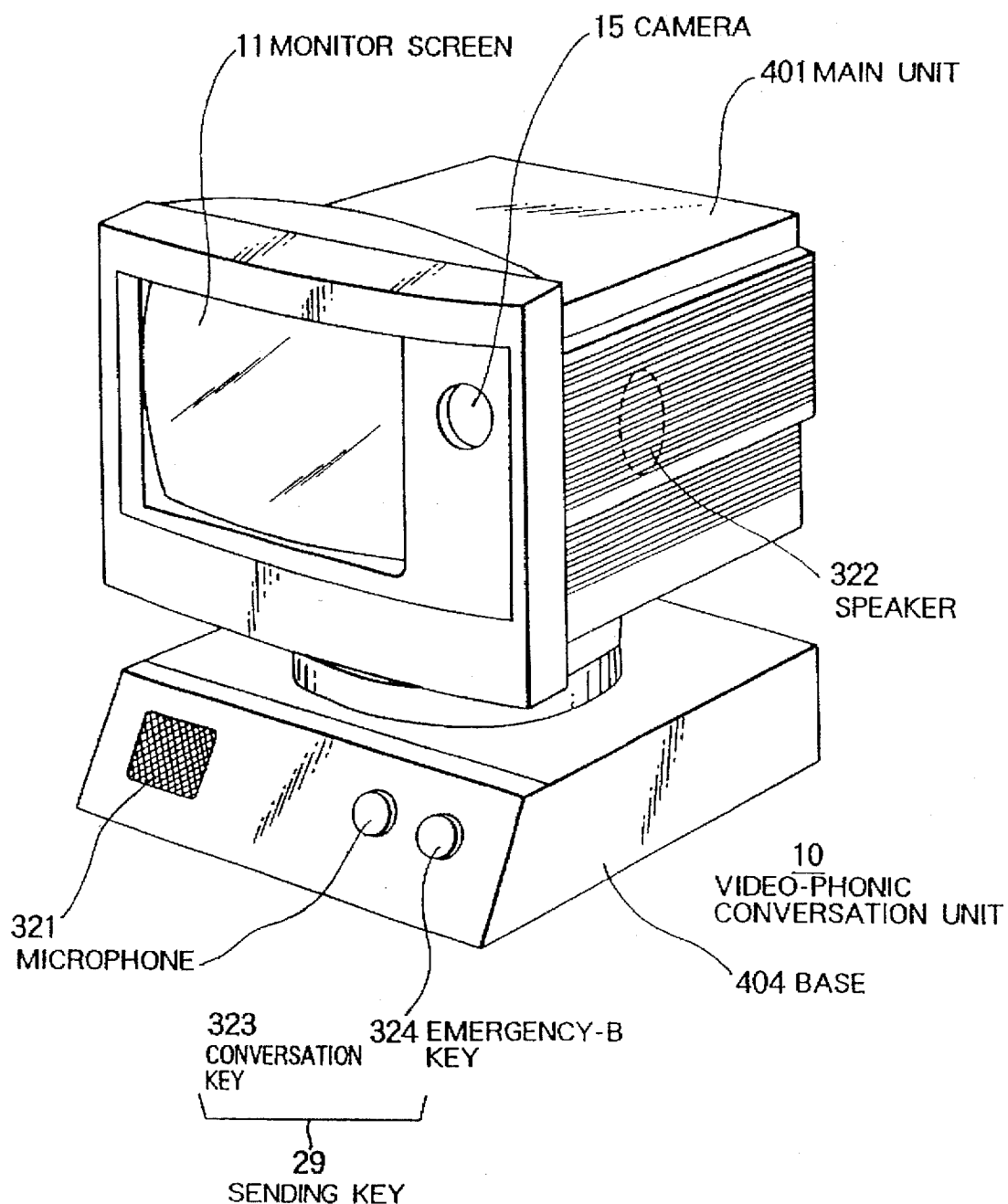
FIG. 4 is a perspective view of a videophonic conversation unit used in the video conversation/monitoring system of the present invention.

FIG. 3 is a block diagram showing the detailed arrangement of the video conversation/monitoring system shown in FIG. 1. The center station terminal system 2 consists of a system controller 9 including a system controller main unit 102, a system control display unit 103 and a system control panel 104, a facsimile 8, and an ISDN line terminating unit 14. The video-phonic conversation unit 5 includes a line controller 31, a conversation monitor screen 6, a conversation camera 7, a conversation microphone 30 and a conversation speaker 28, and these devices are accommodated in an integrated unit as shown in FIG. 4. The video-phonic conversation unit 5 may be connected, on its external video signal input terminal to an image input device such as a drawing device. The end station terminal system A 3 consists of an ISDN line terminating unit 14, a video-phonic conversation unit 10, a come-in detection means 108, an emergency-A key 109, an absence state setting switch 110, a monitoring camera 12, a facsimile 13, and a digital line terminating unit 14. The video-phonic conversation unit 10 consists of a system controller 16 including a line controller 17, a unit controller 310 and a video-phonic signal controller 317, a conversation monitor screen 11, a conversation camera 15, a conversation microphone 321 and a conversation speaker 322 and a sending key set 29, and these devices are accommodated in an integrated unit as shown in FIG. 4. The sending key set 29 includes a conversation key 323 which can be used by a visitor to make a call to have a conversation, and an emergency-B key 324 which can be used by the visitor to make a call at the occurrence of a state of emergency. A video phonic recorder, such as a VTR or a video output device such as a monitor television unit, may be connected by providing an additional video signal input/ output interface for the video-phonic signal controller 317. A guidance talking unit may be connected by providing an additional peripheral device interface for the come-in detection means 108 of the system controller so that the voiced announcement is offered at the beginning or during the service. A number of systems identical to the foregoing end station terminal system A 3 can be connected to the ISDN network 1.

FIG. 4 is a diagram showing an example of the external view of the video-phonic conversation unit 10 used in the video conversation/monitoring system, and it is used for the end station terminal system 3 or 4. The video-phonic conversation unit 10 consists of a videophonic conversation main unit 401 incorporating a conversation monitor screen 11 that displays an image such as a guidance service image for example sent from the center station, a conversation camera 15 that shoots the visitor who faces the video-phonic conversation unit 10 in the end station and a speaker 372 that provides a voiced guidance service for example sent from the center station, and a video-phonic conversation unit base 404 incorporating a conversation microphone 321 that inputs a voice sound of the visitor and a signal interface circuit (system controller 16, etc. not shown in the figure) for the conversation key 232, emergency-B key 324 and sending key as the sending key set 29 used by the visitor for sending the signals from the end station to the center station. The unit 10 is arranged as shown in FIG. 4 so that it can be placed on the desk top.

Figure 5:
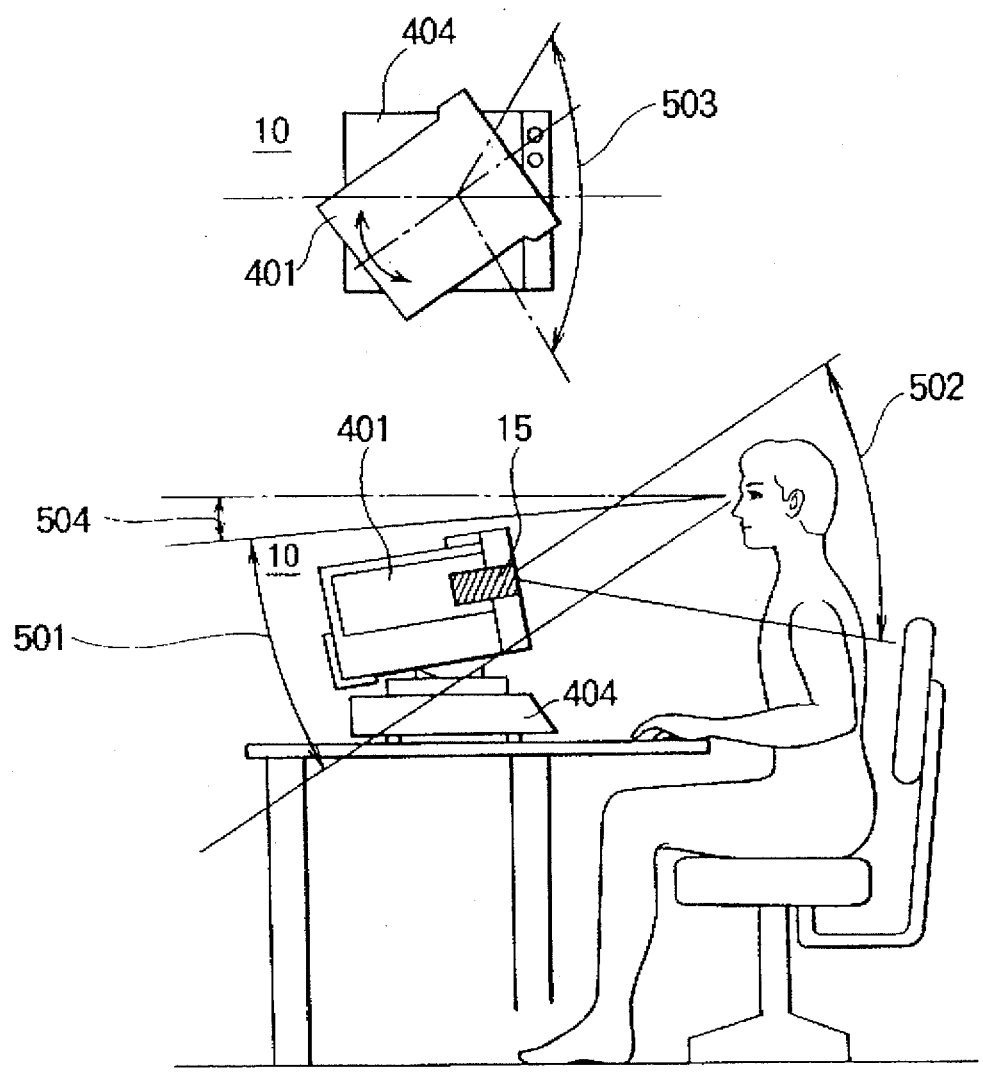
FIG. 5 is diagram showing an example of the manner of use of the video conversation/monitoring system of the present invention.

FIG. 5 is a diagram showing an example of the manner of use of the video-phonic conversation unit 10 shown in FIG. 4. The video-phonic conversation unit 10 has its video-phonic conversation main unit 401 designed swingable against the video-phonic conversation unit base 404 by a maximum of 60° (angle 503) right and left from the center and by a maximum of 8° upward (angle 504) so that the operationability is improved. A visitor is sitting in front of the video-phonic conversation unit 10, and the conversation camera 15 shoots the visitor at a field angle 502. The field angle 502 is set to about 56° that is optimal to cover wide ranges of position and size of the object. When the camera shoots the visitor who views the conversation monitor screen 11 in the range of angle 501 that is slightly downward with respect to the horizontal direction (angle 504) as shown in the figure, the visitor can have a conversation with a person in the center station through a virtually correct line of sight. Since the main unit 401 is swingable horizontally and upwardly as mentioned above, the visitor can have a conversation in the best condition by adjusting the shooting range.

Figure 6:
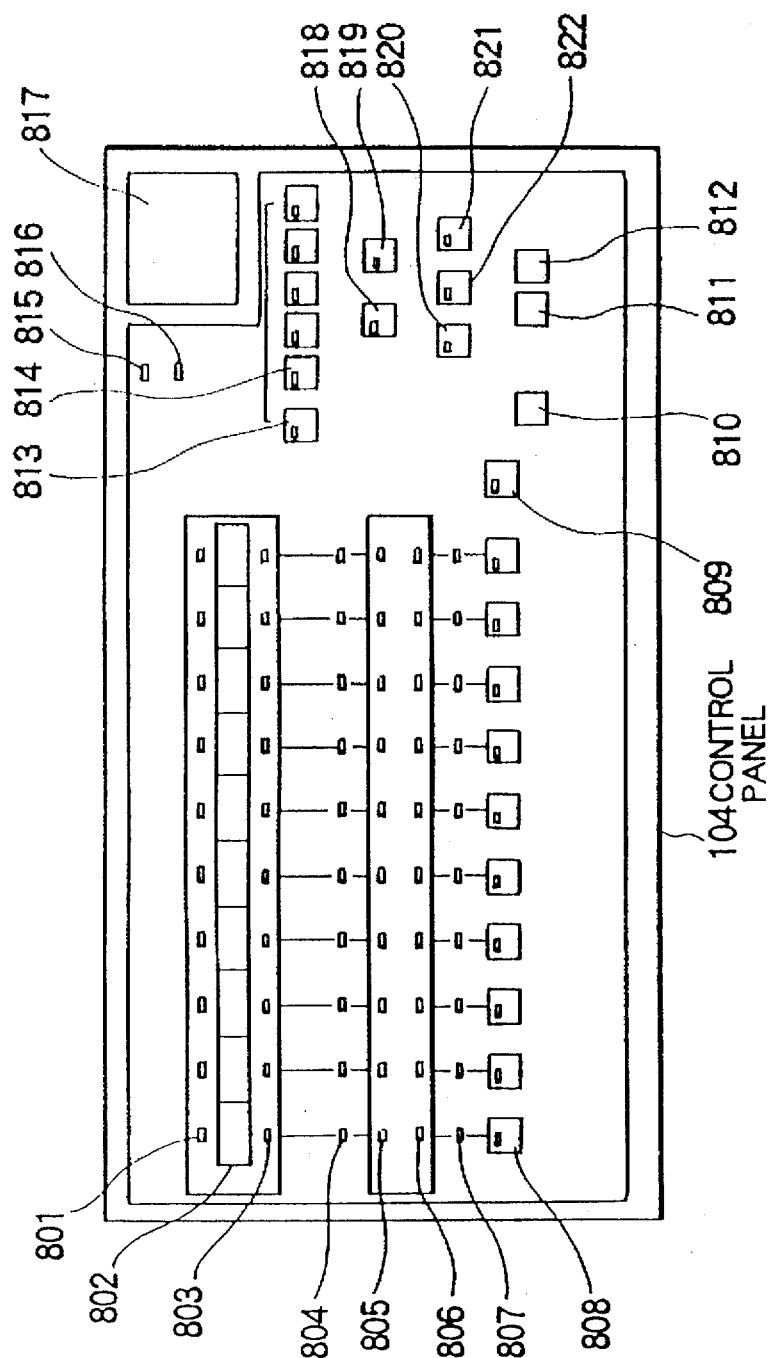
FIG. 6 is a front view of the control panel of the system controller equipped in a center station to be included in the system of the present invention.

FIG. 6 shows an external view of the control panel 104 of the system controller of the center station. The control panel 104 includes indicator lamps 801–806 corresponding to the come-in detection means 108, absence state setting switch 110, emergency-A key 109, visitor's conversation key 323 and emergency-B key 324 of each end station, a key 808 used to control the connection and disconnection between the center station and the end station, a key 814 used to switch cameras of the end station in communication, a switch key 818 used to switch between the outgoing image to the incoming image from an external video input device that is represented by a drawing device (indicated by 203 in FIG. 11), a facsimile communication start key 819, a sub-screen display key 820, a center station videophonic data transmission key 822, a mute key 821 used to turn off the sound transmission from the center station during the communication, a buzzer turn-off key 810 used to turn off the buzzer that notifies an incoming call or the like, a polling key 809 used to carry out the automatic state monitoring for all end stations that constitute the system, a telescope key 811 and wideangle key 812 used to adjust the field angle of the camera, a speaker 817 that releases the received sound signal, a power lamp 815 that indicates the power turnon state, an alarm indicator lamp 816 that indicates the abnormality of the video conversation/monitoring system, and a cable (not shown) that connects the control panel to the video conversation/monitoring system.

Figure 7:
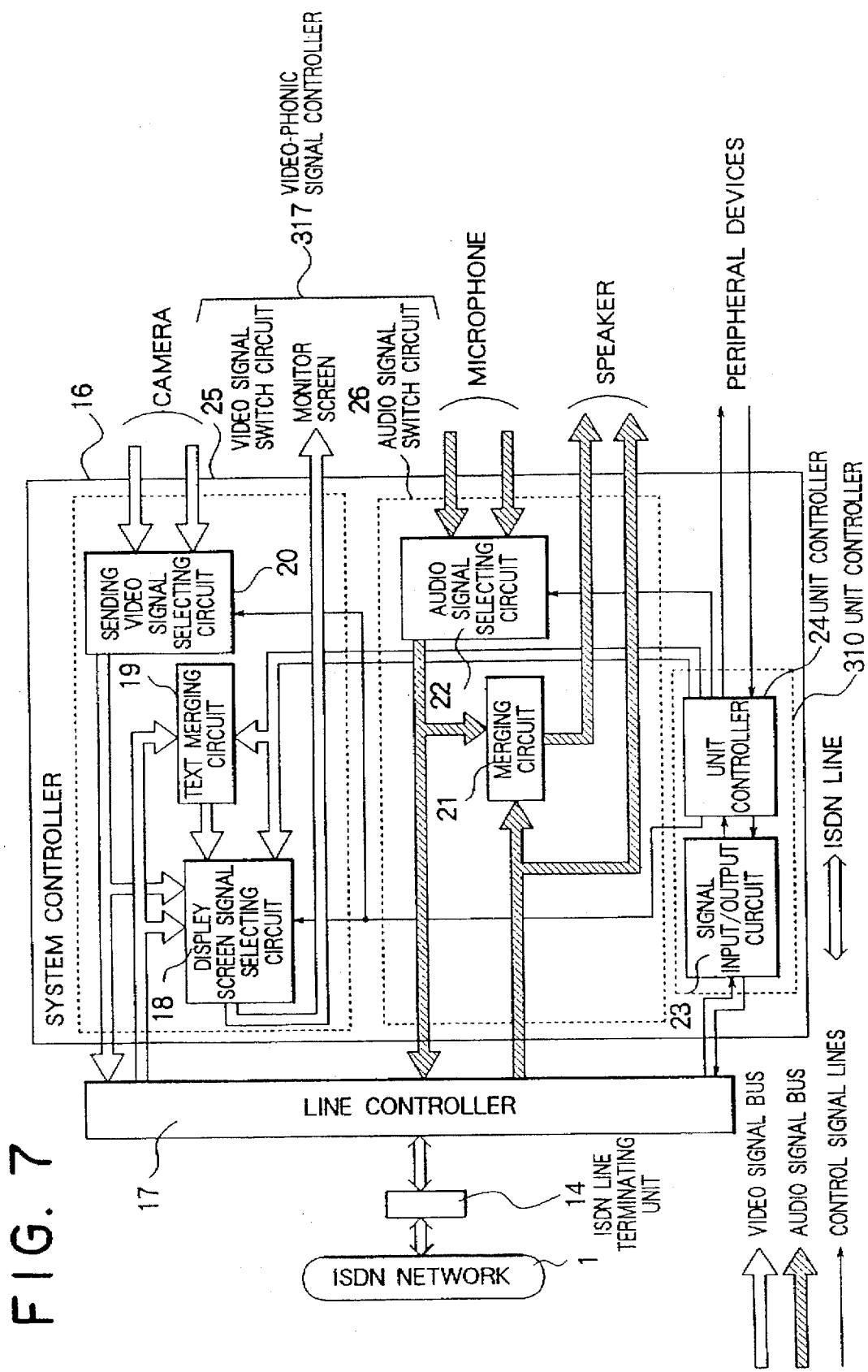
FIG. 7 is a functional block diagram of the video-phonic signal controller used in the end stations of the video conversation/monitoring system of the present invention.

FIG. 7 is a block diagram showing the arrangement of the system controller 16 and line controller 17 of the videophonic conversation unit used in the end station. The line controller 17 receives a digital signal including an audio, video, and control data signals from the ISDN network 1 through the ISDN line terminating unit 14, and transmits a digital signal including an audio, video, and control data signals to the ISDN network 1. The line controller 17 operates, based on the means as shown in the Japanese patent publication JP-A-5-207449 mentioned previously, such that its receiving circuit separates the line digital signal into a video signal, audio signal, and control data signal, and converts the video and audio signals into analog signals. Its sending circuit converts the video and audio signals into digital signals, multiplexes the video, audio and control data signals, and sends the signals onto the line. The system controller 16 consists of a video-phonic signal controller 317 including a video signal switch circuit 25 and audio signal switch circuit 26, and a unit controller 310. The controller 310 consists of a data signal input/output circuit 23 that implements the control data signal input and output with the line controller 17, and unit control circuit 24 that implements the coding and decoding for the data signal, controls the internal circuits of the controller, and inputs the signals from the detection means. The unit control circuit 24 receives the control data signal from the data signal input/output circuit 23 and produces control signals for operating the audio signal switch circuit 26 and video signal switch circuit 25 so that video and audio signals are selected from among input signals and delivered to the center station. The circuit has a contact-mode signal input/output function for interfacing with peripheral devices, such as the come-in detection means 108, and for delivering the signals from these peripheral devices to the line controller 17, which then sends a certain code signal depending on the states of these signals to the center station by using the D channel of the ISDN line. The audio signal switch circuit 26 is a circuit for implementing the audio signal input and output with the audio input and output means of the line controller 17, and it consists of an outgoing audio signal selecting circuit 22 and an audio signal merging circuit 21. The audio signal selecting circuit 22 operates to deliver the audio signal received from the center station equipment through the line controller 17 to the conversation speaker 322, to deliver the audio signal from the conversation microphone 321 to the line controller 17, and to deliver the received audio signal to the VTR 315. The audio signal merging circuit 21 merges the received audio signal and the audio signal from the conversation microphone 321, and accordingly it is possible to record a bidirectional conversation on a VTR for example. The video signal switch circuit 25 implements the video signal input and output with the video input and output means of the line controller 17, and it consists of a display video signal selecting circuit 18, a sending video signal selecting circuit 20 and a text merging circuit 19. The outgoing video signal selecting circuit 20 selects one video signal out of the video signal of the monitoring camera 12 as the first video input means and the video signal of the conversation camera 15 as the second video input means, and delivers the selected signal to the line controller 17. The outgoing video signal selecting circuit 20 may be arranged to select one of three or more video signals inclusive of a video signal from a third video input means. The display video signal selecting circuit 18 selects a video signal to be fed to the conversation monitor screen 11 as the video output means from among the video signal received from the center station, the video signal of the monitoring camera 12 as the first video input means, the composed video signal produced by the text merging circuit 19 and the text signal produced by the unit controller 27. The text merging circuit 19 merges the text signal produced by the unit controller 27 and the video signal from the center station to produce a composed video signal for displaying a text such as a guidance message superimposed on the received image. Consequently, when the system is extended to include a monitoring video monitor screen in an end station, it becomes possible to send the image of the conversation camera 15 as the second video input means to the center station, while delivering the video signal of the monitoring camera 12 as the first video input means to the monitoring video monitor screen.

Figure 8:
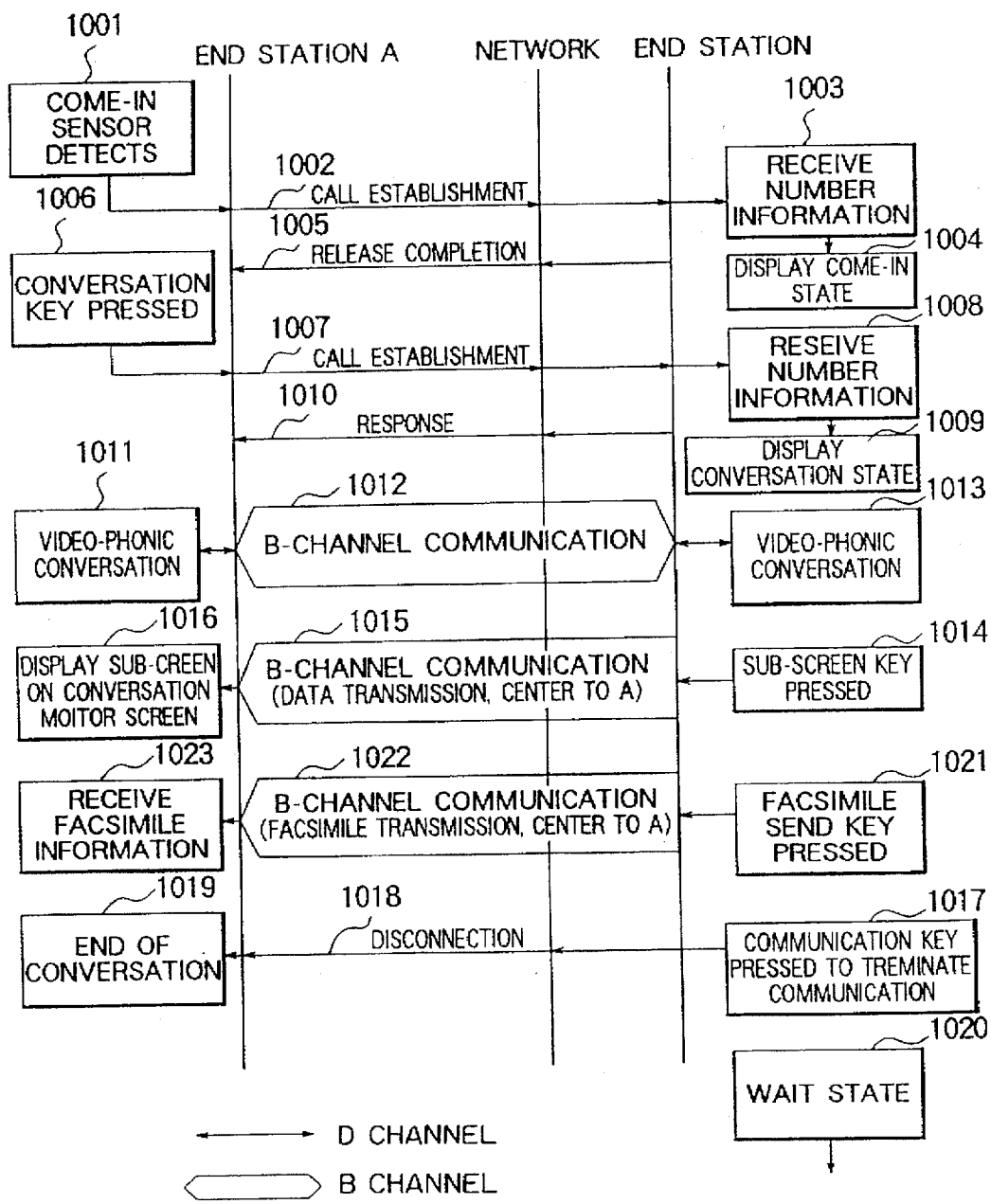
FIG. 8 is a diagram showing the communication procedure (for normal communication) of the video conversation/ monitoring system of the present invention.
Figure 15:
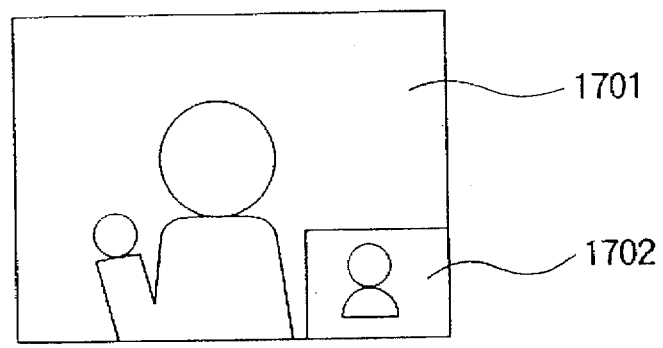
FIG. 15 is a diagram showing an example of display (view of the self station) on the video-phonic conversation unit of an end station included in the video conversation/monitoring system of the present invention.

The operation of the conversation and monitoring functions of this system will be explained with reference to the charts of communication procedures shown in FIG. 8 through FIG. 13. FIG. 8 is a diagram showing the procedure of normal conversation between a calling end station 3 and the center station 2. When a visitor enters a room where the end station system 3 is installed, the detection means 108 located at the entry detects the movement of the visitor (step 1001), the controller 310 sends a call establishment signal including the come-in notification signal to the center station (step 1002), the center station 2 receives the come-in notification signal included in the call establishment signal (step 1003), and it turns on the lamp 804 of the relevant end station in the come-in information display area of the control panel 104 (step 1004). Alternatively, a buzzer may be activated to notify the visitor's entry instead of turning on the lamp. When the visitor presses the conversation key 323 provided on the base 401 of the video-phonic conversation unit 10 of the end station (step 1006), the system controller 310 sends a call establishment signal including a conversation request notification signal to the center station (step 1007), the center station receives the conversation request notification signal included in the call establishment signal (step 1008), it turns on the lamp 805 of the relevant end station in the conversation request information display area of the control panel 104 (steps 1009, 1010), and it connects the B-channel signal so that the video-phonic bidirectional conversation begins between the visitor and the guide in the center station (steps 10111–1013). The visitor talks to the guide to give a message, inquiry, etc. and the guide responds to the request to provide a service based on the voice or image, and the demand of the visitor is fulfilled by the video conversation/monitoring system of this invention. During the conversation, when the sub-screen key 820 provided on the operation panel 104 is pressed (step 1014), the control data is sent to the end station through the system controller 102 (step 1015), and the image of the visitor, i.e., the image produced by the camera 15 of the video-phonic conversation unit, is displayed on the sub-screen located at the bottom right corner 1702 of the monitor screen of the video-phonic conversation unit, as shown in FIG. 15 (step 1016). In case where the visitor wishes to have text or graphics information such as a map, the facsimile sending key 819 provided on the system control panel of the center station is pressed (step 1021), the line controller and facsimile are controlled so that the facsimile signal is sent to the facsimile of the end station during the video-phonic conversation (step 1022), and the text or graphic information such as a map can be offered to the visitor (step 1023). The guide of the center station confirms the completion of conversation service and presses the call disconnection key 808 provided on the control panel 104 (step 1017), and communication with this end station is terminated (step 1018, 1019). Following termination of this conversation, the center station system enters the wait state again waiting for a call from an arbitrary end station among a plurality of end stations (step 1020).

Figure 9:
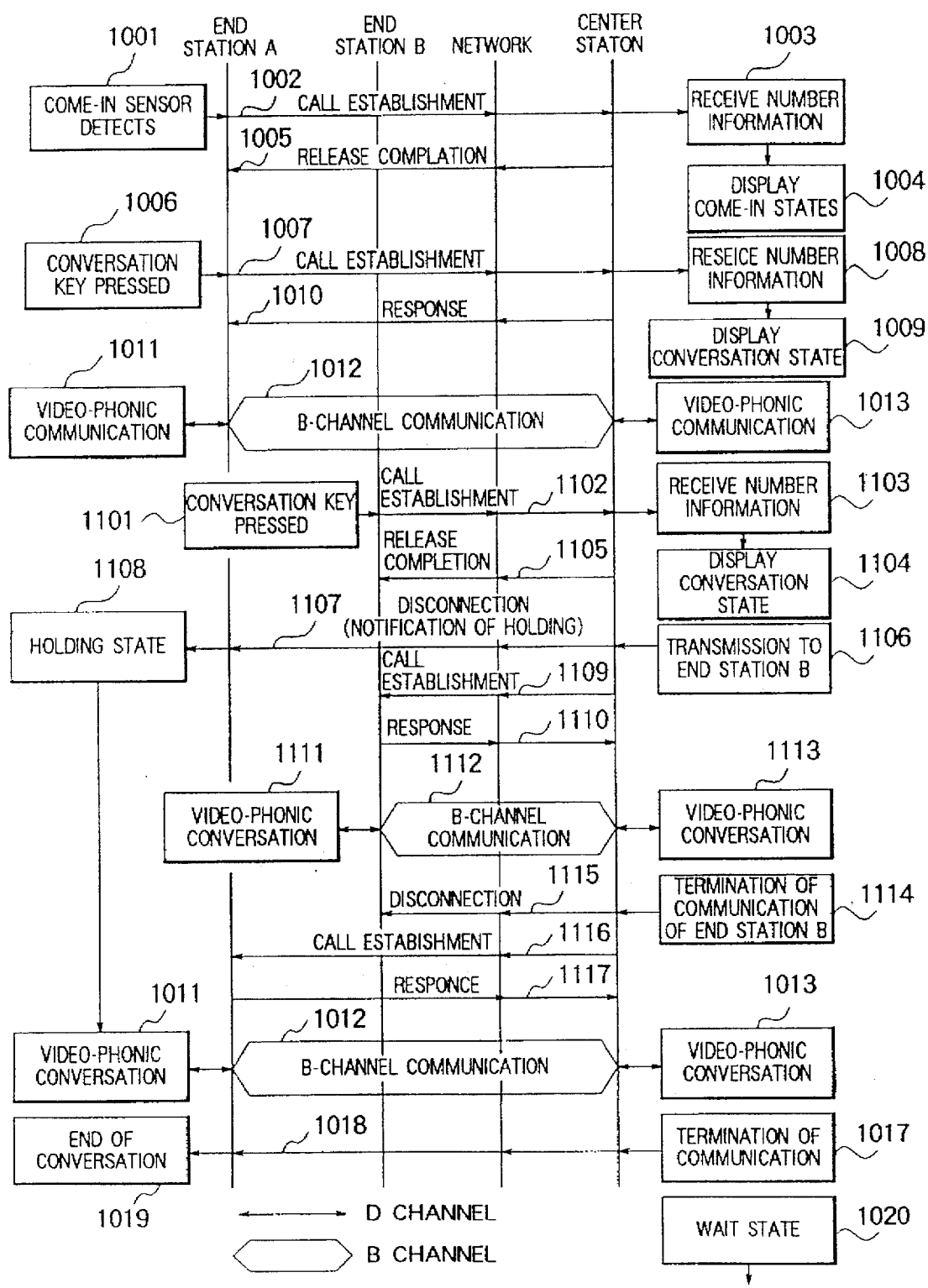
FIG. 9 is a diagram showing the communication procedure of the video conversation/monitoring system of the present invention.
Figure 18:
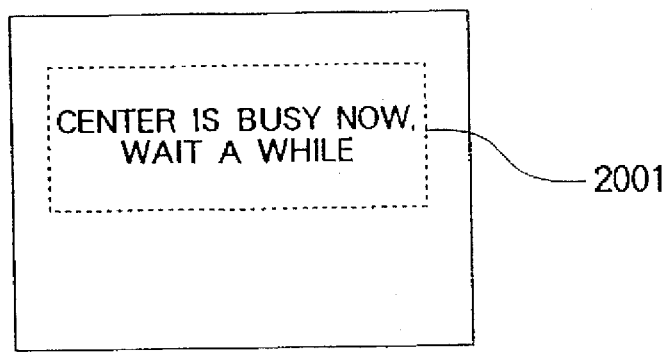
FIG. 18 is a diagram showing an example of display (guidance indicating the busy state of center station) on the video-phonic conversation unit of an end station included in the video conversation/monitoring system of the present invention.

FIG. 9 is a diagram showing the procedure used to establish conversation service between any one of a multiplicity of end stations and the center station, specifically in the case where there are two end stations. For end station A designated therein, a visitor enters the room of end station A and presses conversation key 323 located on a base 401 of the video-phonic conversation unit 10, and begins a conversation with the guide in the center station 2 (step 1001–1013) in the same manner as explained above with reference to FIG. 8. During the conversation with the end station A, if the conversation key 323 of another end station B is pressed (step 1101), the center station terminal system 2 detects the conversation request of the end station B based on the call establishment signal including the conversation request information carried by the D channel signal (step 1103), and it turns on the lamp relevant to the end station in the conversation request information display area 104 on the control panel 104 (step 1104). The guide of the center station tells the visitor of the end station A that the conversation needs to be suspended temporarily. The guide then switches to the conversation with the end station B by pressing the communication key 808 relevant to the end station B on the control panel 104 (step 1106). Consequently, the video-phonic conversation unit 5 of the center station sends control information to place the video-phonic conversation unit 10 corresponding to end station A on hold, at which time communication with the end station A is disconnected (step 1107). The communication state indicator lamp on the control panel 104 keeps blinking to remind the center station that end station A is holding (step 1108). After that, the video-Phonic conversation unit of the center station makes an automatic call to the end station B (step 1109), and begins a conversation (step 1110–1113). The visitor of the end station B gives a message, inquiry, etc. through the conversation with the center station, and the demand is fulfilled. On receiving the on-hold control information from the center station, the video-phonic conversation unit 10 of end station A displays a screen indicative of the state of holding as shown in FIG. 18 on the monitor screen 111. On completion of the conversation with the end station B, the communication key 808 for the end station B is pressed on the control panel 104 of the center station (step 1114) and communication with the end station B is terminated (step 1115). A call 5 is then made from the center station to end station A (step 1116) and the conversation begins (step 1117, 1011–1013). The visitor of the end station A resumes the conversation with the center station to continue the suspended service, and the demand of the visitor is fulfilled. Upon confirming the completion of conversation service with end station A, communication key 808 on control panel 104 is pressed (step 1017), and communication with this end station is terminated (step 1018, 1019). Following the termination, the center station system enters into the wait state again, waiting for a call from one of the plurality of end stations (step 1020) linked in the system.

Figure 10:
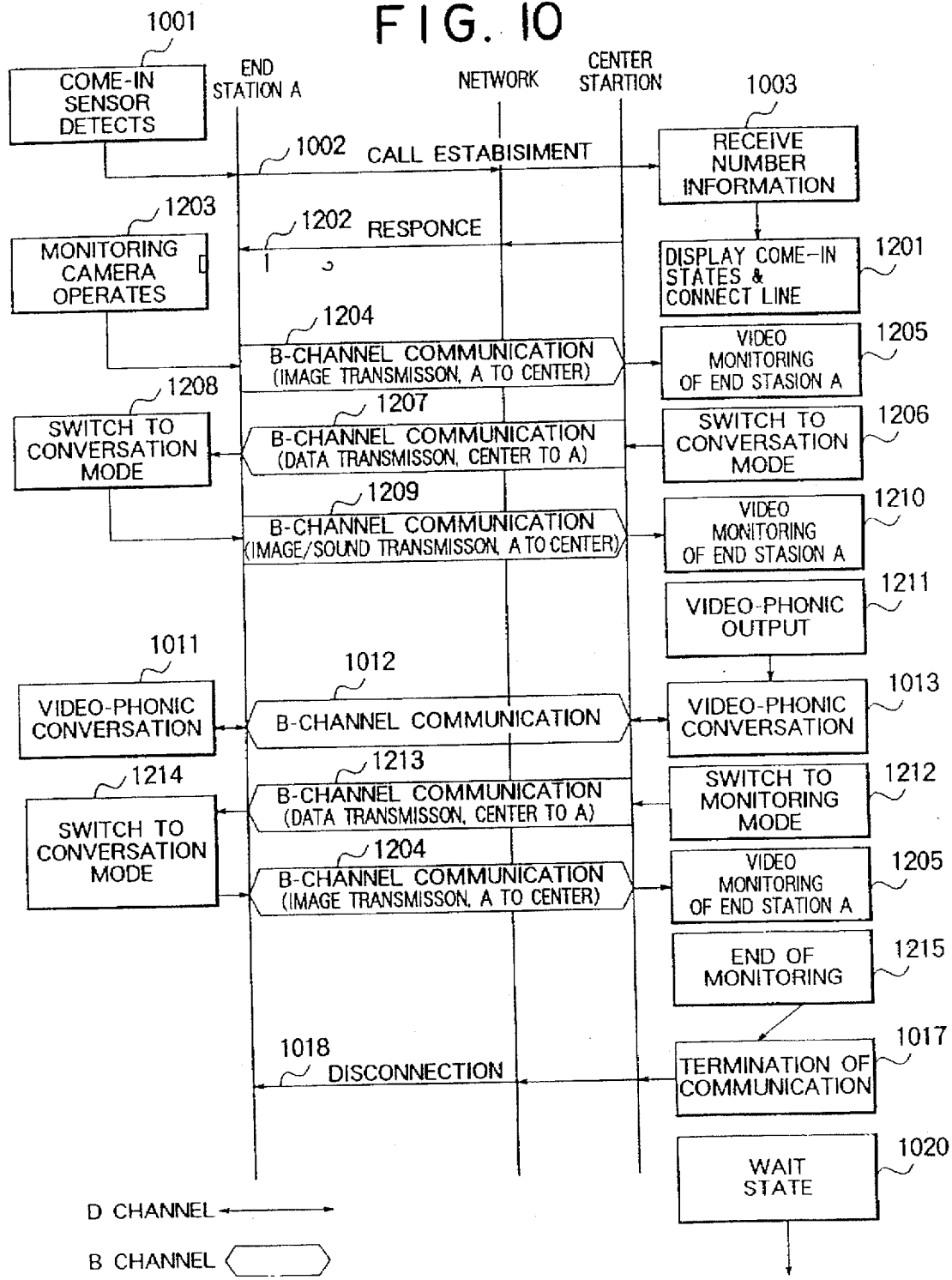
FIG. 10 is a diagram showing the communication procedure (for automatic calling by center station) of the video conversation/monitoring system of the present invention.

FIG. 10 is a diagram showing the procedure of system operation for enabling the center station to automatically begin a conversation with an end station by using the come-in notification signal. When a visitor enters the room where the end station system is installed, the detection means 108 detects the entry of the visitor (step 1001) and the system controller 310 transmits a call establishment signal including a code indicative of the come-in notification (step 1002), as has been explained on FIG. 8. The center station receives the come-in notification signal included in the call establishment signal (step 1003), turns on a lamp relevant to the end station in the come-in information display area of the control panel 104, connects the line (step 1201), and enables the B-channel signal communication. Initially, at end station A, the monitoring camera 12 is operated to send the video input signal from the end station to the center station (step 1203), and at the same time the sound in the end station picked up with the microphone 321 mounted on the video-phonic conversation unit is sent to the center station (step 1204). The monitor screen of the video-phonic conversation unit 10 of the end station then displays a guide screen such as the one shown in FIG. 17. The center station checks the state of the interior of the end station A based on the audio and video information, and if a service based on conversation deems to be needed, the video-phonic output key 822 on the control panel 104 is pressed (step 1206) and the video-phonic signal of the video-phonic conversation unit 5 of the center station is sent out. The video signal of the end station is the one produced by the monitoring camera 12, and by pressing the conversation camera key 813 among the camera selection keys on the control panel 104, information for switching the video input means of end station is transferred to the videophonic signal controller 317 of the end station through the system controller (step 1207), and the video signal to be sent from the end station is switched to the output signal of the camera mounted on the video-phonic conversation unit (step 1208). Consequently, it becomes possible to have a bidirectional video-phonic conversation between the visitor and the guide in the center station (steps 1209–1211). The visitor receives a video-phonic service of the guide of the center station (steps 1011–1013), and the demand of the visitor is fulfilled. Furthermore, in the case of switching the video signal of the end station from the image of the conversation camera 15 to the image of the monitoring camera 12, the monitoring camera key 814 among the camera selection keys on the control panel 104 is pressed (step 1212), and information for switching the video input means of the end station is transferred to the video-phonic signal controller 317 of the end station through the system controller 310 (step 1213), and the video signal to be transmitted from the end station is switched to the output signal of the monitoring camera (steps 1214, 1204, 1205). In the case of terminating the monitoring following the confirmation of the image produced by the monitoring camera 12 (step 1215), the call disconnection key 808 on the control panel 104 is pressed (step 1017), and the communication with the end station is terminated (step 1018). Alternatively, a call may be disconnected by the end station terminal system on expiration of a certain time length following the detection of the exit of the visitor by the detection means 108. Following the termination of conversation, the center station system enters the wait state again for a call from an arbitrary end station among a plurality of end stations (step 1020). The monitoring camera 12, which is the first video input means of the end station, may be provided with a zoom control mechanism and field angle control mechanism based on servo motors, with an interface circuit for controlling the field angle or shooting direction of the monitoring camera 12 based on a digital signal being added, so that the center station sends a call control signal that controls the field angle or shooting angle of the monitoring camera 12 as the first video input means of the end station to the end station through the line controller 17, thereby carrying out the remote control of the end station monitoring image.

Figure 11:
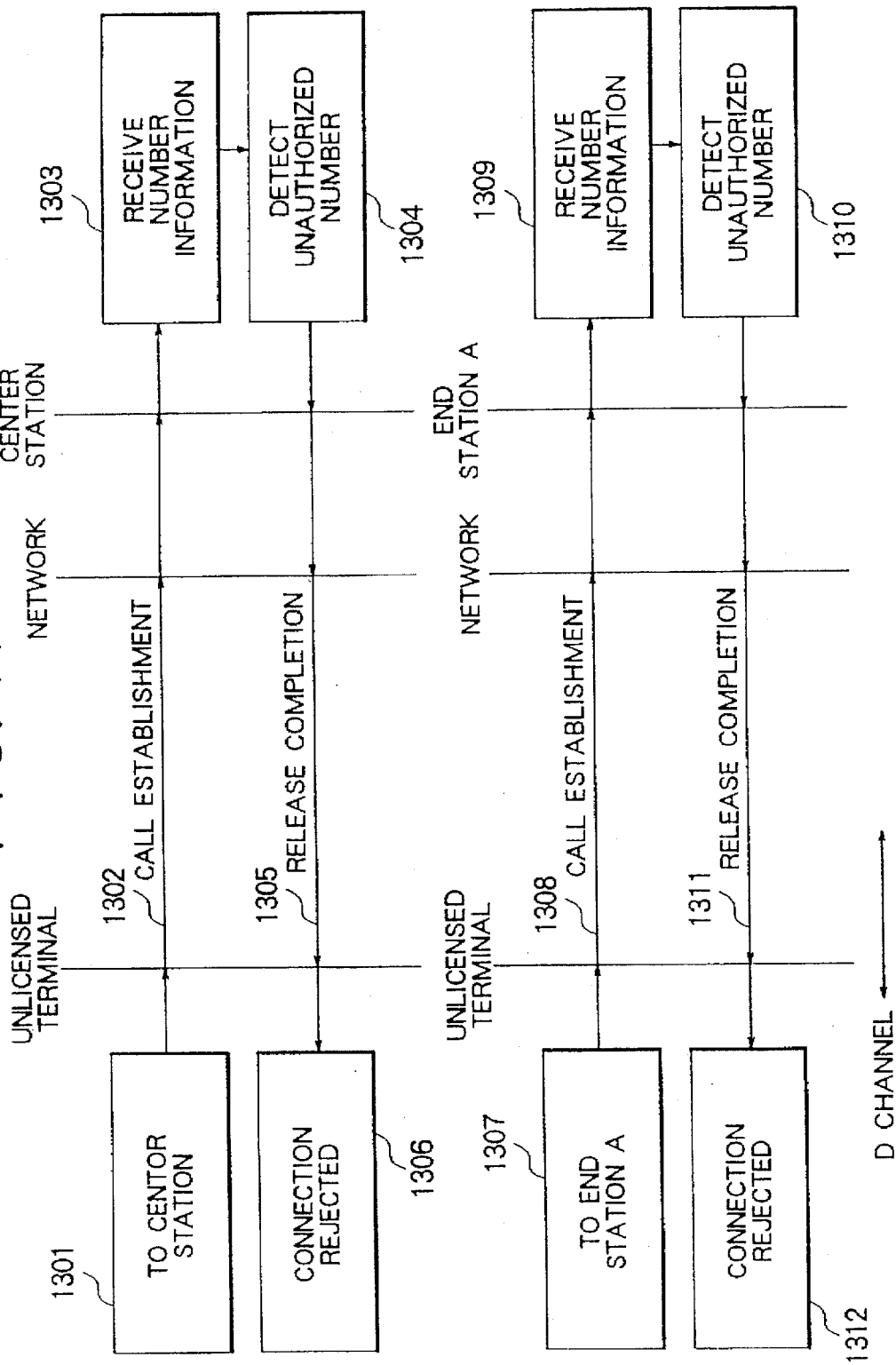
FIG. 11 is a diagram showing the communication procedure (for rejection of calls from unlicensed terminal stations) of the video conversation/monitoring system of the present invention.

FIG. 11 is a diagram showing the communication procedure of the case of a call from an unlicensed terminal station, such as a digital videophone, operating on the ISDN line to the system of the present invention, the procedure being based on a function of detecting a call from an unlicensed terminal station and disabling its connection to the system. The center station system controller 102 and end station system controller 310 maintain a record of registered numbers of the center station and end stations that constitute the video conversation/monitoring system. When a call establishment signal is sent from an unlicensed terminal station to the center station 2 (or to end station 3 or 4 of this system) through the D-channel of the ISDN (steps 1301, 1302, 1307, 1308), the system controller 310 of the center station (or end station) receives the number information included in the call establishment signal (steps 1303, 1309), collates it with the registered numbers (steps 1304, 1310) and stores the call establishment signal, and if it is found to be not registered, a release completion signal is sent to the unlicensed terminal station (steps 1305, 1311) and a process for preventing the connection is carried out (steps 1306, 1312). The terminal system of each end station may send the number information from the non-registered station to the center station terminal system. Consequently, it is possible to prevent the leak of service activities of the guidance system to which this system is applied and also prevent violations against the system.

Figure 12:
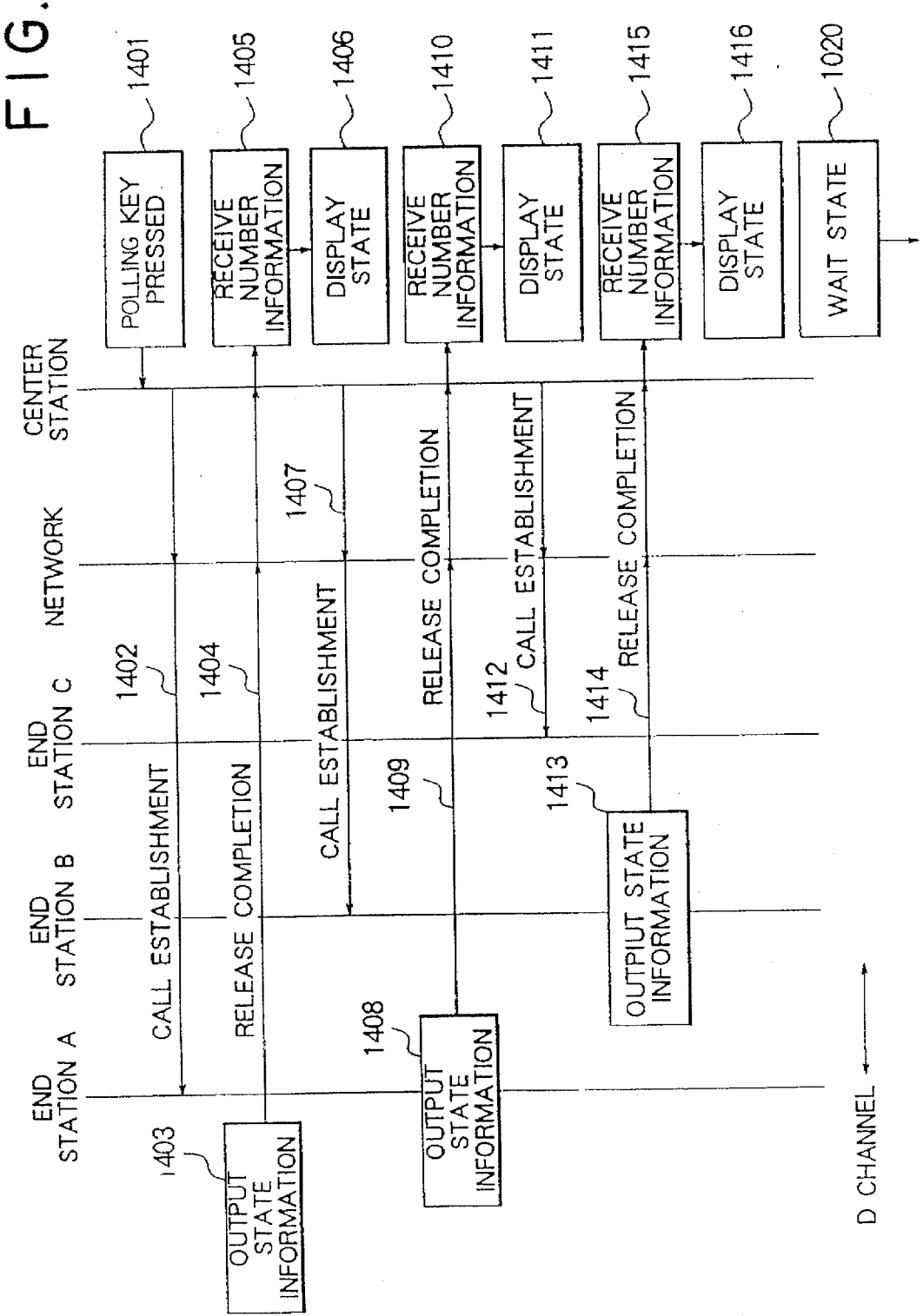
FIG. 12 is a diagram showing the communication procedure (for monitoring of all end stations based on the poling function) of the video conversation/monitoring system of the present invention.
Figure 13:
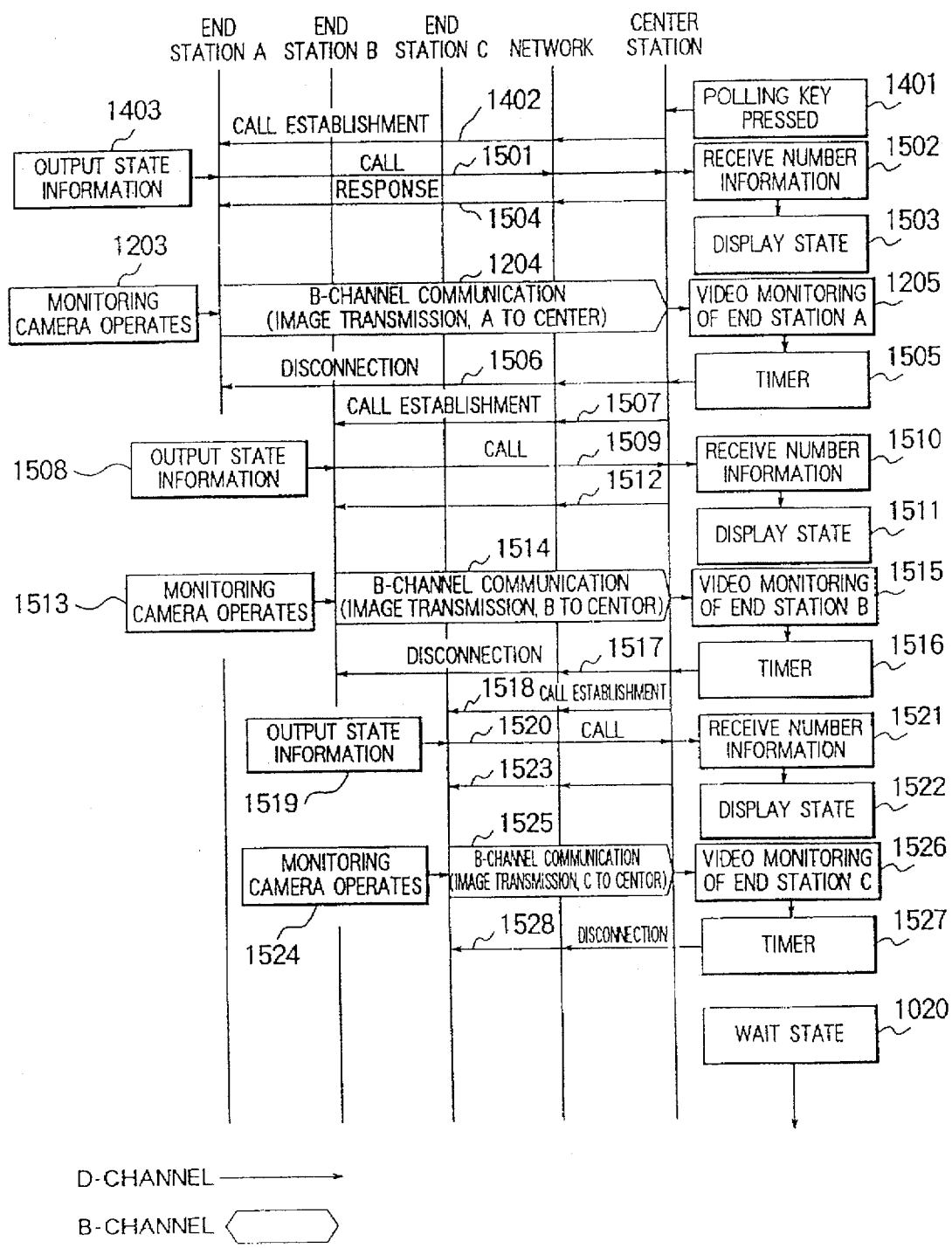
FIG. 13 is a diagram showing the communication procedure (for video monitoring of all end stations based on the poling function) of the video conversation/monitoring system of the present invention.

FIG. 12 and FIG. 13 are diagrams showing the operational procedure of the polling monitoring function of an embodiment of the video conversation/monitoring system of present invention that connects the center station sequentially to all end station terminal systems to receive information on the state of the end stations and implements the automatic video monitoring of the interior of end stations by means of the monitoring camera 12 installed in each end station. Explained here is the procedure of a system consisting of a center station and three end stations A, B and C. FIG. 12 shows the operational procedure of the case of monitoring only information on the state of each end station. The polling key 809 on the control panel 104 is pressed (step 1401) to send at first a call establishment signal to the end station A (step 1402), and in response to this signal, the end station A sends a D-channel signal including a code indicative of the absence of the keeper in the end station, for example, to the center station (step 1403). The center station receives the code indicative of the absence of the keeper in the end station, for example, included in the D-channel signal (step 1405), and turns on the lamp relevant to the end station in the state display area of the control panel 104 (step 1406). The D-channel signal sent from the end station A to the center station is a signal that signifies the release completion (step 1404), and the communication between the center station and the end station A is terminated without having a line connection of the B-channel. Next, communication with the end stations B and C takes place sequentially by following the same procedure as that for the end station A to receive the state information of all end stations that constitute the system, with the results being displayed at once on the control panel 104, and it is possible for the center station to monitor the state of all end stations in an integral manner (steps 14071416). FIG. 13 shows the operational procedure of the case of carrying out the video monitoring of each end station. The polling key 809 on the control Panel 104 is pressed (step 1401) to send at first a call establishment signal to the end station A (step 1402), and in response to this signal, the end station A sends a D-channel signal including a code indicative of the state of the end station to the center station (steps 1403, 1501). The center station receives the code indicative of the state of the end station included in the D-channel signal (step 1502) and turns on the lamp relevant to the end station in the state display area of the control panel 104 (step 1503), and connects the line to enable the B-channel signal communication (step 1504). At the end station A, the monitoring camera 12 is operated to send the video input signal from the end station to the center station (step 1203), and at the same time the sound in the end station picked up with the microphone 321 mounted on the base 401 of the videophonic conversation unit 10 is also sent to the center station (step 1204). At this time, the monitor screen of the video-phonic conversation unit 10 of the end station displays a guidance screen as shown in FIG. 18 (step 1205). The B-channel signal communication begins and it lasts for a time length, e.g., 20 sec, set on a timer since the beginning of image reception from the monitoring camera 12 (step 1505), the line is disconnected on expiration of the set time (step 1506), and subsequently connection is made to the end stations B and C sequentially to carry out the same procedure as for the end station A to receive the state information and monitor images of all end stations that constitute the system, and it is possible for the center station to monitor the state of all end stations in an integral manner as in the case explained on FIG. 12. The polling monitoring function based on another operational procedures different from the foregoing will now be explained.

(1-1) The center station terminal system 2 transmits a call establishment signal including information of state notification request of the end station terminal system A; (1-2) the end station receives the call establishment signal, confirms the state notification request of the end station terminal system and thereafter transmits a release completion signal including information of acknowledgement indicative of the normal reception of information. The center station confirms the normal information transmission from the end station based on the information included in the releasez completion signal. (1-3) After transmitting the release completion signal, the end station sends a call establishment signal including the state information of the end station terminal system to the center station. (1-4) The center station receives the call establishment signal including the state information of the end station, confirms the state information of end station included in the call establishment signal, and thereafter transmits a release completion signal including the information of acknowledgement indicative of the normal reception. The end station confirms the normal information transmission from the center station based on the information included in the release completion signal. The center station terminal system 2 repeats the same operational procedure as that of the end station A for the remaining end stations B and C connected to the ISDN network, thereby implementing the state monitoring for all end station terminal systems. In case information notification based on the call establishment signal has not taken place normally, the failure of normal notification is detected based on the release completion signal including the signal indicative of the failure of reception, and a procedure of recurrent communication is started so that the state information of all end station terminal systems is transmitted normally.

Figure 14:
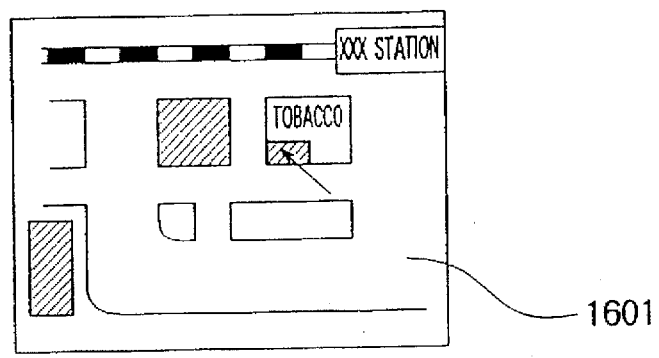
FIG. 14 is a diagram showing an example of display (image entered to the center station equipment) on the video-phonic conversation unit of an end station included in the video conversation/monitoring system of the present invention.
Figure 16:
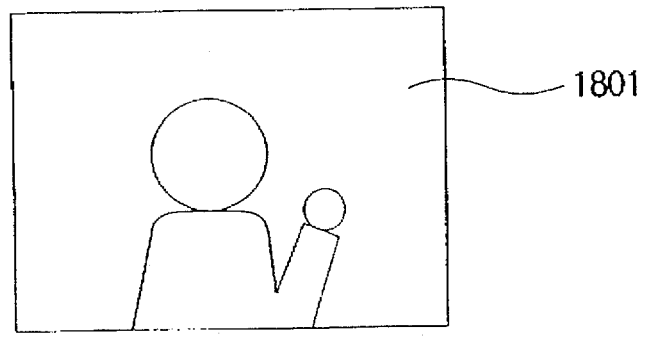
FIG. 16 is a diagram showing an example of display (view of normal conversation) on the video phonic conversation unit of an end station based on the inventive video conversation/monitoring system of the present invention.

FIG. 14 through FIG. 16 are diagrams showing displays on the monitor screen of the video-phonic conversation unit 10 installed in the end station. FIG. 14 shows, as an example, map information 1601 as a guidance screen produced by using the drawing device 203 that is the second video input means of the center station and displayed on the monitor screen of the video-phonic conversation unit 10 of the end station.

FIG. 15 shows a display of an image produced by the camera as the second video input means incorporated in the video-phonic conversation unit 10 of the end station displayed on the sub-screen 1702 that is superimposed on an image 1701 produced by the camera as the first video input means incorporated in the videophonic conversation unit 10 of the center station.

FIG. 16 shows a display of an image 1801 s produced by the camera as the first video input means incorporated in the video-phonic conversation unit of the center station displayed on the overall monitor screen.

Figure 17:
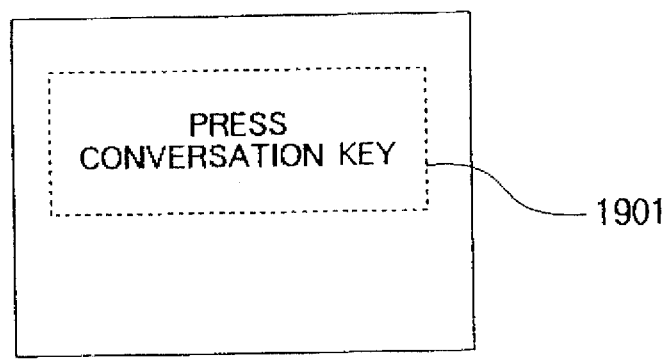
FIG. 17 is a diagram showing an example of display (guidance prior to the normal conversation) on the video-phonic conversation unit of an end station included in an video conversation/monitoring system of the present invention.

FIG. 17 shows a display 1901 on the monitor screen of the video-phonic conversation unit 10 of the end station of the case when the conversation function is not operating.

FIG. 18 shows a display 2001 on the monitor screen of the video-phonic conversation unit 10 of the case when the center station terminal system 2 is amid communication with other end station.

Figure 19:
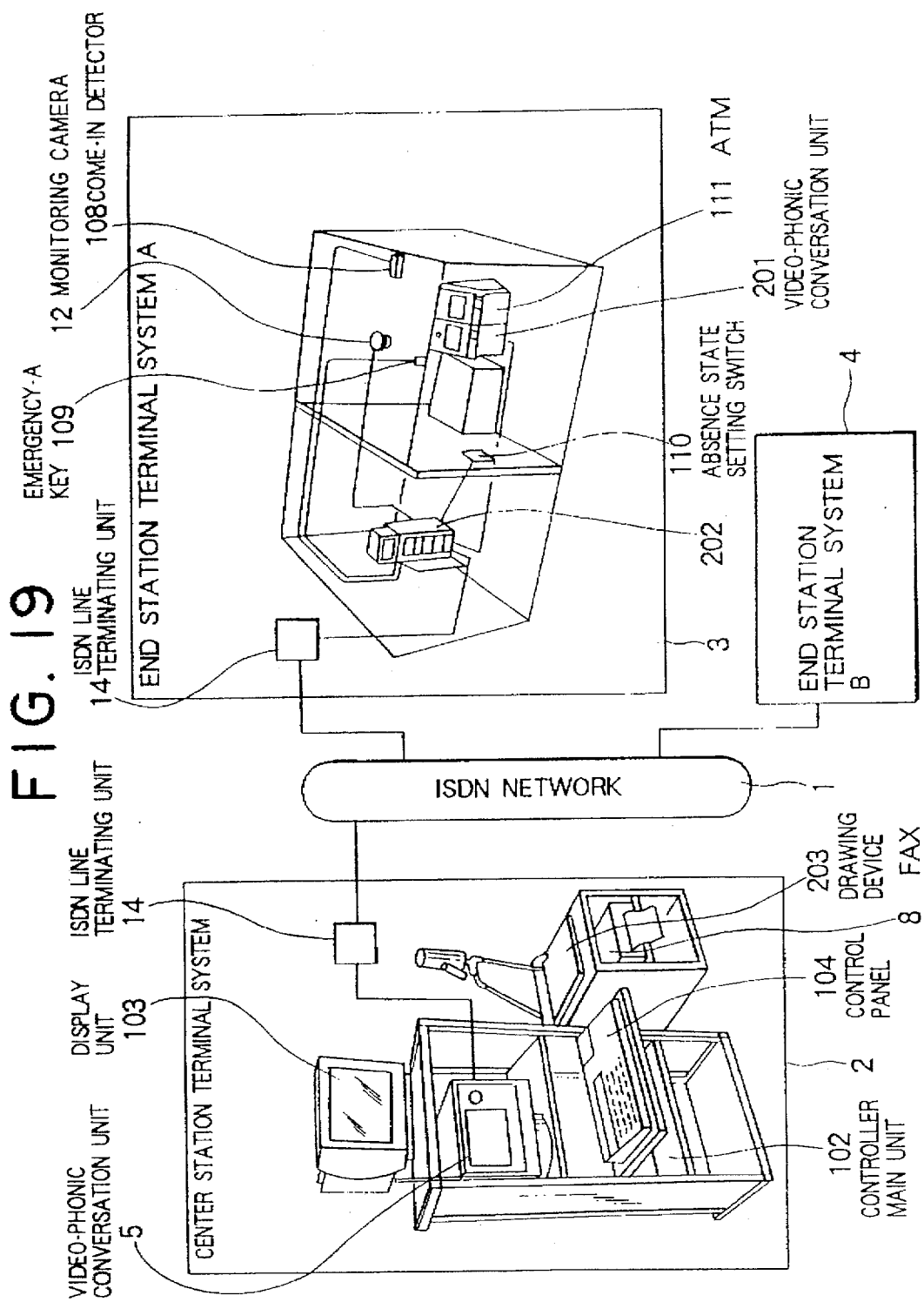
FIG. 19 is a perspective view of an example of the extended video conversation/monitoring system based on this invention.
Figure 20:
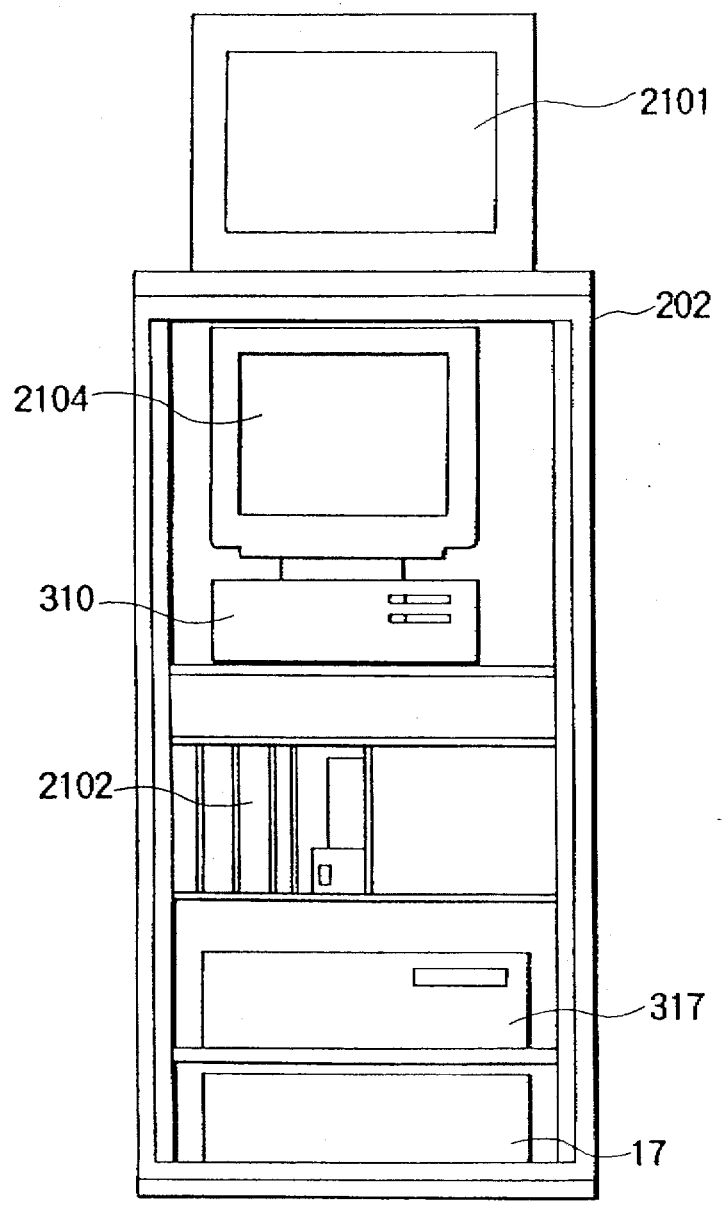
FIG. 20 is a front view of a system controller used in an end station of the video conversation/monitoring system of the present invention.
Figure 21:
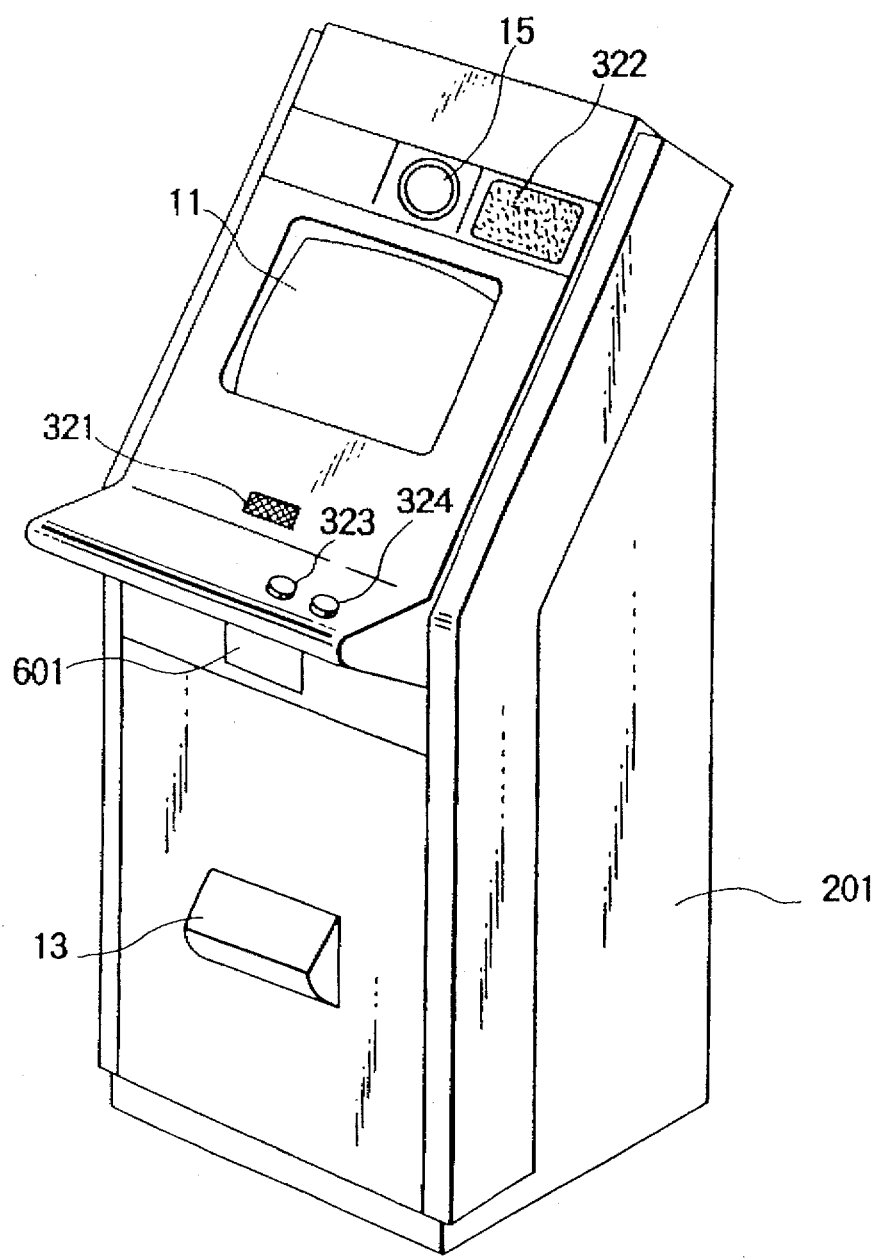
FIG. 21 is a perspective view of the floorstand video-phonic conversation unit used in an end station of the video conversation/monitoring system of the present invention.

FIG. 19 is a diagram showing the external view of the video conversation/monitoring system based on another embodiment of this invention. In this system, the center station terminal system has the additional provision of a drawing device 203 for entering characters and figures as image signals and a facsimile 8, in addition to the arrangement shown in FIG. 3, with the intention of enhancing the usefulness of the video conversation/monitoring system by offering more detailed information based on texts, characters and figures to visitors of the end stations. In the end station terminal system, ATM111 (an Auto Teller Machine or a Cash Dispenser) is placed, the function for the visitor and the function for the manager of the end station terminal system are separated as shown in FIG. 20 and FIG. 21, and the function for the visitor, which is represented by the input and output of images and sounds, is integrated in a floor-stand conversation unit 201, on which a monitoring camera 102 and come-in detection means 108 are equipped as shown in FIG. 21, installed in the room where the visitor enters. The function for the terminal system control implemented by the system controller 16 is integrated in a cabinet 202 shown in FIG. 20, and it is installed in another room.

The devices that constitute this system will be explained by using FIGS. 20, 21 and 22. FIG. 20 shows the controller of the end station terminal system integrated in the cabinet 202, in which are included the function of system control that is not accessed directly by the visitor who has entered the room of end station to get various conversation services, among various functions that constitute the end station terminal system shown in FIG. 3. The controller includes a system controller 16 consisting of a unit controller 310 and video-phonic controller 317 and a line controller 17, which are housed in the cabinet 202 by being separated from the video-phonic conversation unit 10 (shown in FIG. 4) explained previously, and further includes another monitor screen 2101 used to view the same screen as the monitor screen 11 provided for the visitor and a display unit 2104 used to display the system management result or the like. In the figure, 2102 denotes an interface for connecting the separated functional blocks.

Through the separate arrangement of the end station terminal system for individual functions as shown in FIG. 19 so that items that need not be accessed directly by the visitor are installed as a separate unit as shown in FIG. 20, it is possible to confine the range of system fault caused by erroneous operations or destruction for example, and consequently the reliability and maintainability of the system can be enhanced and the unit section used for the video-phonic conversation for the visitor can be made compact and light in weight, whereby a video conversation/monitoring system that is less restricted in terms of the installation room and is highly versatile can be offered.

FIG. 21 is a diagram showing the external view of the floor-stand video-phonic conversation unit 201, which consists of a monitor screen 11 that displays images, e.g., guidance service images, sent from the center station, a camera 15 that shoots a visitor who faces this video-phonic conversation unit in the end station, a microphone 321 that picks up the voice of the visitor, sending keys 323 and 324 used by the visitor to make transmission from the end station to the center station, a speaker 322 that delivers sounds, e.g., guidance service, sent from the center station, a facsimile unit 13, a detection means 601 for detecting that a visitor exists in front of the video-phonic conversation unit, and a video-phonic signal interface circuit explained on FIG. 3, with all these devices being accommodated in a floor-stand cabinet.

Figure 22B:
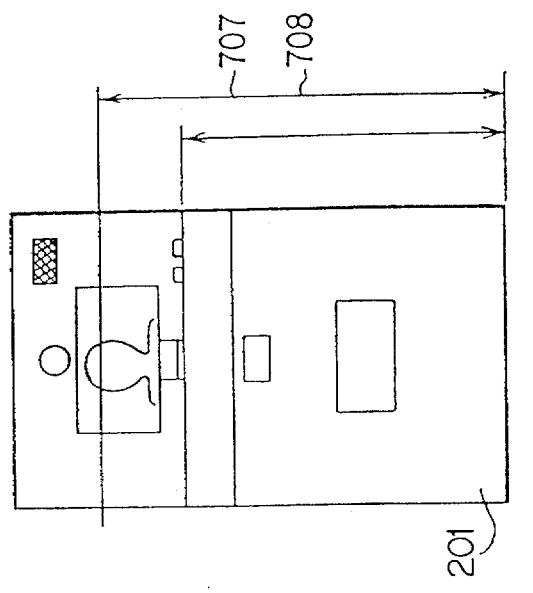
FIG. 22 is a diagram showing the manner of use of the floor-stand video-phonic conversation unit shown in FIG. 21.
Figure 22A:
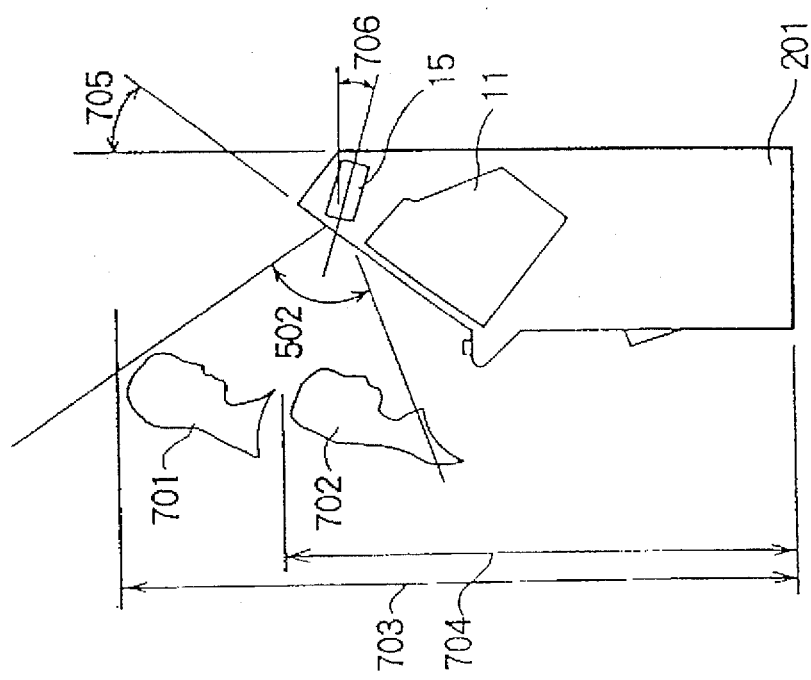

FIG. 22 is a diagram showing an example of the manner of use of the video-phonic conversation unit shown in FIG. 21. A visitor is standing in front of the video-phonic conversation unit 201 as shown in FIG. 22, and the camera 15 shoots the visitor 701 or 702 in the range of field angle 502. The field angle 502 is set to about 56° and the position is so set that the camera can shoot the face of the visitor who can be as tall as 120 180 cm approximately. The camera angle is optimized to allow some variation of position of the visitor. Based on this setting of the height and field angle of the camera, it can shoot troth a tall visitor 701 and a short visitor 702 and even a visitor who is sitting in a wheelchair. The conversation call key 323 and emergency-B key 324 have their height set as shown by 708 in FIG. 22 and the monitor screen 320 has its position set so that the visitor's sight line has a height as shown by 707 in FIG. 22, and the unit can be operated by visitors of the range of tallness mentioned above.

Figure 23:
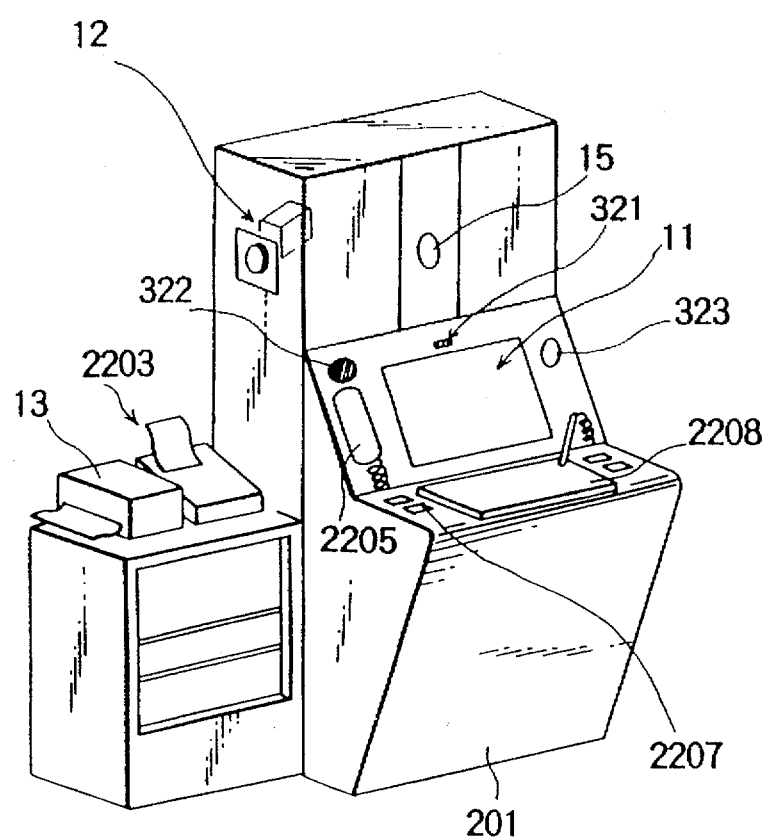
FIG. 23 is a perspective view of an example of an extended video-phonic conversation unit of the end station included in the video conversation/monitoring system of the present invention.
Figure 24:
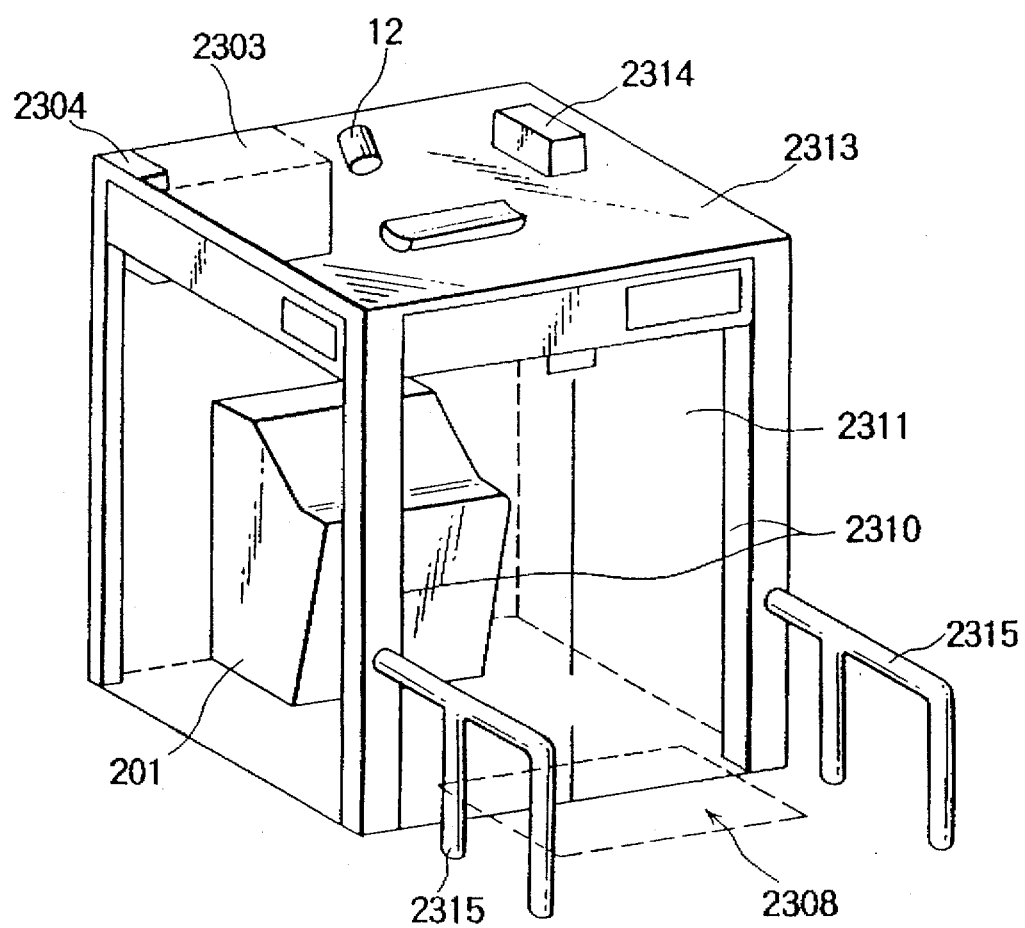
FIG. 24 is a perspective view of an example of the extended facility of an end station included in the video conversation/monitoring system of the present invention.
Figure 25:
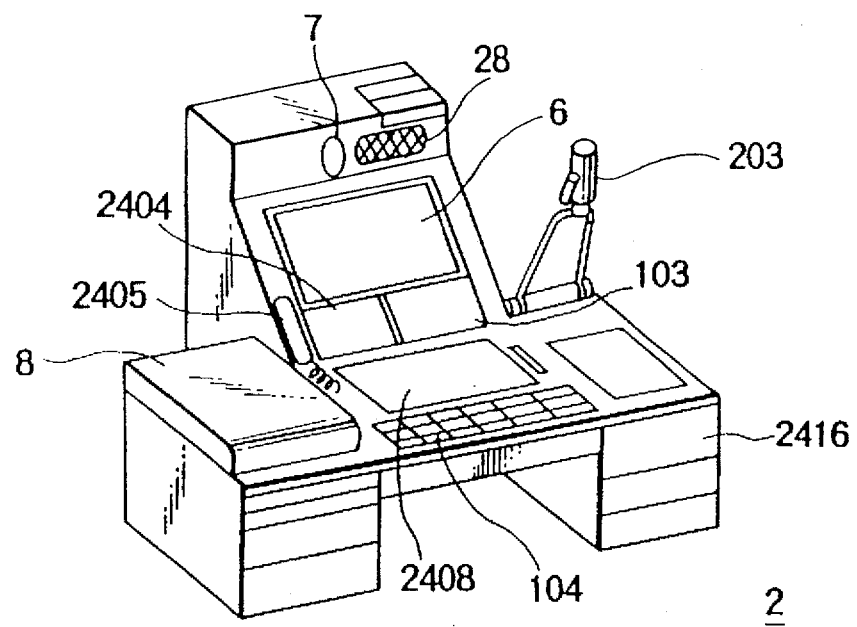
FIG. 25 is a perspective view of an example of the extended video-phonic conversation unit of the center station based on the video conversation/monitoring system of the present invention.

FIGS. 23, 24 and 25 are diagrams showing the arrangement of the apparatus with the extended performance through the addition of functions to the video conversation/ monitoring system described above in consideration of the operationability.

FIG. 23 shows the arrangement of the apparatus used in the end station, in which the end station equipment 201 includes a monitoring camera 12 as the first video input means, a conversation camera 15 as the second video input means, a conversation monitor screen 11 as the video output means, a conversation microphone 321 as the audio input means, a speaker 322 as the audio output means, a conversation key 323 as the calling means and a facsimile 13, which are all explained on FIG. 3, and it further includes a hand-write input device 2208, a selection key set 2207, a conversation handset 2205 and a screen printer 2203. The equipment incorporates the system controller main unit 310. The selection keys 2207 are switching means for selecting whether or not the hand-write input device 2208 and conversation handset 2205 are used. The hand-write input device 2208 is connected to the line controller 307 through a serial communication means, and it is used to send a visitor's message, state or will in the form of characters or figures to a receiving party of communication. The hand-write input device 2208 digitizes the entered character and figure information, and the resulting data signal is transmitted through the serial communication means to the center station by way of the line controller 307 and ISDN network, and the information is delivered to the guide as the receiving party in the center station. The hand-write input device 2208 has a display screen, on which prerecorded guidance information (e.g., operational guidance) of each service item is displayed in various forms in advance and characters and figures can be written in certain portions of the screen. The display screen of the hand-write input device 2208 has an area for entering the selection of service by the visitor. The service selection function is included in the hand-write input device 2208. It is also possible for the visitor to use the hand-write input device 2208 as a substitution of memo during the conversation. The use of the hand-write input device 2208 enables dumb persons and foreigners to make easy access to the system by use of characters and figures. The conversation handset 2205 is used in place of the microphone 321 and speaker 322 in the noisy environment, and in this case by selecting the use of the handset 2205 through the operation of the selection key 2207, a message "use the handset" for example is displayed on the conversation monitor screen and the conversation handset 2205 becomes operative. The screen printer 2203 receives in parallel the video output signal to the conversation monitor screen 11 and it operates to print the screen information of the moment when the print key on the screen printer is pressed. Consequently, it is possible to copy various guidance service screens sent from the center station. By placing the printer on the top of the unit as shown in the figure, the interior wiring of the room can be eliminated.

Next, an embodiment of the arrangement of the end station facility that can be installed outdoors will be explained with reference to FIG. 24. The end station facility 2313 has a box-like structure that can accommodate the end station equipment 201 and several people including visitors, and it has a front and side walls made of semi-transparent glass so that the interior can be seen easily from the outside. The use of the semitransparent glass is effective for blocking the sun light and other external light thereby to alleviate the temperature rise inside the facility when it is placed outdoors. Provided inside the facility are a thermal sensor 2304 and an air conditioning device 2303 that maintains the air temperature automatically in response to thermal data provided by the thermal sensor so that the visitor is comfortable. The thermal data detected by the thermal sensor 2304 may be sent to the center station through the line controller 307 so that it monitors the interior temperature of the end station. The end station facility 2313 has an automatic front door, which opens on detecting the presence of a visitor by means of an automatic door sensor 2308. Provided inside the automatic door 2311 is a visitor's tallness sensor 2310, which measures the tallness of the visitor who is going to enter the facility at a resolution of 5 cm for example, so that the field angle of the conversation camera 15 as the second video input means is adjusted. Alternatively, the end station equipment 201 is provided at the bottom with a height control mechanism that moves the equipment up and down by means of a motor or the like so that the visitor can easily operate the equipment. Consequently, the optimal operating environment is offered to visitors of various tallness including children, adults or persons sitting in wheelchairs. Placed at the top of the facility is a voice guidance unit 2314 having several kinds of voiced guidance messages recorded on a recording medium such as a ROM device so that a voiced message for each service item is offed to the visitor. Consequently, the guidance of service items, the guidance of service commencement, the guidance of service completion at the end of conversation, and the guidance at the occurrence of fault of the conversation service function can be offered in response to the automatic door sensor 2308. Several lamps that indicate the state of use of the facility may be provided. A lamp may be attached to the ceiling of the facility. At the front of the end station facility 2313, fence rails 2315 may be fitted as shown in the figure so that the chance of erroneous detection of the automatic door sensor 2308 in response to passersby decreases.

Next, another example of the arrangement of the center station equipment will be explained by using FIG. 25. The center station equipment 2 includes a conversation camera 7 as the video input means of the video-phonic conversation unit, a conversation monitor screen 6 as the video output means, a conversation speaker 28 as the audio output means, a conversation microphone 30 as the audio input means, a control panel 104 of the system controller 9, a display screen 103, a drawing device 203 and a facsimile 8, and it additionally includes a second monitor screen 2404 as the second video output means for displaying the image of the conversation camera 7 or drawing device 203, a handwrite input device 2408, a conversation handset 2405 and a conversation information recorder 2416, with all these devices being disposed integrally as shown in FIG. 25. The video-phonic conversation unit of the center station uses three kinds of monitor screens as the video output means. The first monitor screen 6 displays a conversation and monitoring images as the main screen, the second monitor screen 2404 displays an image of the conversation camera 7 or drawing device 203, enabling the guide of the center station to known what image is being sent to the end station, and the third monitor screen 103 may be used as the display panel of the system controller 9 for verifying the communication log information and the system operation. On the first monitor screen 6, an image of the self station produced by the conversation camera 7 or the like may be displayed as a sub-screen on the main screen, or it is also possible provide an independent second monitor screen 2404 to display the content of the sub-screen so that the whole main screen 6 is used for the conversation or monitoring. The hand-write input device 2408 consists of a display screen and a writing means, and it is connected to the hand-write input device 2208 of the end station by the data signal interface by way of the line controller. The display screen displays prerecorded guidance information for each service item in various display forms, and characters and figures can be written by the writing means in certain portions of the screen. By providing a selection input area on the display screen of the hand-write input device 2208 so that the operator can select a service suitable for the conversation by using the writing means, an intended service screen will appear. By writing characters or figures on the display screen with the writing means, these characters and figures are displayed on the display screen of the hand-write input device 2208 of the end station, and accordingly it is possible to communicate in the form of characters and figures. The service item selecting function is included in the handwrite input device 2408. It is also possible for the guide of the center station to use the hand-write input device 2408 as a momo during a conversation. This function supplements the video-phonic conversation service, and more satisfactory services can be offered. By superimposing an image of the display screen on the video signal of the second monitor screen 2402, with a map being set in the drawing device for example, it is possible to perform a guidance service while pointing a position on the screen with the writing means. In case more than one center station equipment is installed in the center station, the conversation handset 2405 is used when an equipment is located in a noisy environment, and in this case a hand-free conversation based on the speaker 28 and microphone 30 is suspended during a conversation using the conversation handset 2405. The conversation information recorder 2416 connected to the video-phonic conversation unit operates to record images and sounds of conversation and monitoring. The conversation information recorder 2416 has the same interface condition as the video-phonic conversation unit, and one or a combination of writable laser disk, CD-ROM and long-time recording VTR can be used for it depending on the system service items.

The extended video conversation/monitoring system explained on FIGS. 23, 24 and 25 is a system that can offer detailed and easy guidance services through the combination of proper image, character, figure and sound information. It can also offer proper guidance services for handicapped people and foreigners.

The video conversation/monitoring system explained above for the embodiments of this invention can be applied to a variety of guidance service systems through the optimization of application and system control software resources depending on the purpose and items of service. Examples of application of the inventive system include guidance systems for local public and governmental facilities, e.g., power supply s firm, post office, police station and fire fighting station, guidance systems for semi-public facilities, e.g., railroad and other transport station, bank, leisure facility, department store and other commercial facilities, service guidance systems for hospitals and other medical facilities, and service guidance systems for individuals, e.g., videophone, information retrieval, etc.

The present invention arranged as explained above has the following effectiveness.

(1) The integrated unit can readily be installed on a desk, and the system is applicable to various service jobs through the connection with peripheral devices such as a facsimile and drawing device.

(2) The use of the ISDN network reduces the communication cost, and the system with the ability of enhanced secrecy protection and violence protection offers efficient multi-media communication services.

(3) The provision of the visitor detection means, emergency notification means, absence-state setting means and transmission means readily enables video monitoring and state monitoring, besides the conversation function.

(4) The optimization of man-machine interface including the location of the conversation camera as the video input means and the field angle of conversation monitor screen as the video output means enables wide range video input for shooting a child, tall adult and people sitting in a wheelchair without the need of adjustment, enables easy view of the guidance screen, and enables total video monitoring in different view angles through the provision of a monitoring camera.

We claim:

1. A video conversation/monitoring system comprising:
   a center station; and
   at least one end station connected with said center station through an ISDN line,
   wherein said end station includes:
      a detector which detects a presence of a person,
      an automatic calling unit automatically establishing a call between said center station and said end station in response to an output of said detector,
      a first camera which outputs a first image detected by said first camera,
      a second camera inputting with a second image detected by said second camera,
      a voice input/output unit,
      a display unit, and
      a controller which controls sending/receiving information by sending the input voice and one of output images of said first and said second cameras to said center station through the ISDN line, switching between output images of said first and second cameras to be sent to said center station in response to a switching indication from said center station, and outputting image and voice sent from said center station to said display unit and said voice input/ output unit,
   wherein said center station has a conversation with said end station and monitors said end station by monitoring voice and image sent from said end terminal.

2. A video conversation/monitoring system according to claim 1, wherein said end station further comprises:
   a input key for requiring a conversation with said center station,
   said controller sends a call establishment signal including a first notification signal through the ISDN line when establishing a call in response to output of said input key, and said controller sends a call establishment signal including a second notification signal through the ISDN line when establishing a call in response to output of said detector, and
   wherein said center station comprises:
      a system control unit which receives a call establishment signal including one of the first notification signal and the second notification signal and identifies a calling category, and a display unit displaying the identified result.

3. A video conversation/monitoring system according to claim 2, wherein said end station further comprises:

an emergency key for notifying an emergency to said center station, said controller sends a call establishment signal including a third notification signal through the ISDN line when establishing a call in response to output of said emergency key, and wherein, in said center station, said system control unit receives a call establishment signal including one of the first notification signal, the second notification signal and the third notification signal, and identifies a calling category, and s aid display unit displays the identified result.

* * * * *